(12) United States Patent
Iwasaki et al.

(10) Patent No.: US 6,393,218 B1
(45) Date of Patent: May 21, 2002

(54) CAMERA

(75) Inventors: Hiroyuki Iwasaki; Yukitaka Takeshita; Yoji Naka, all of Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 5 days.

(21) Appl. No.: 09/708,464

(22) Filed: Nov. 9, 2000

(30) Foreign Application Priority Data

Nov. 9, 1999 (JP) ............................................. 11-317742
Dec. 27, 1999 (JP) ............................................. 11-369226

(51) Int. Cl.$^7$ ............................................. G03B 17/04
(52) U.S. Cl. ............................................. 396/79; 396/349
(58) Field of Search ............................. 396/79–83, 349

(56) References Cited

U.S. PATENT DOCUMENTS

| | | | | |
|---|---|---|---|---|
| 4,885,600 A | * | 12/1989 | Iwasa et al. | 396/81 |
| 5,016,993 A | * | 5/1991 | Akitake et al. | 396/79 X |
| 5,392,159 A | * | 2/1995 | Sasaki et al. | 396/79 X |
| 5,592,250 A | * | 1/1997 | Shimizu | 396/79 |
| 5,850,577 A | * | 12/1998 | Ito | 396/80 |

* cited by examiner

*Primary Examiner*—W. B. Perkey
(74) *Attorney, Agent, or Firm*—Sughrue Mion, PLLC

(57) ABSTRACT

A camera capable of obtaining stable resolution and saving cost is provided.

A camera includes a fixed cylinder 20 fixed to a camera main body, a rotatable ring 21 that is allowed to rotate around the optical axis when driven by a first driving gear 1, a focus cylinder 22 linked to the rotatable ring 21 through a cam mechanism so as to move linearly in the optical axis direction in association with a rotation of the rotatable ring 21, and a rotationally movable cylinder 23 engaged with the focus cylinder 22 in the optical axis direction so as to move in association with a movement of the focus cylinder 22 in the optical axis direction and provided rotatably around the optical axis with respect to the focus cylinder 22 in the rotating direction so as to rotate when driven by a second driving gear 2, wherein a picture is taken by effecting a zooming operation by driving the second driving gear 2 while changing a distance between two lens groups, and after setting a desired magnification by changing a relative distance between the two lens groups, effecting a focusing operation by driving the first driving gear 1 while maintaining the distance between the two lens groups.

13 Claims, 19 Drawing Sheets

CAMERA

BACKGROUND OF THE INVENTION

1. Field of the Invention

The present invention relates to a camera provided with a zoom lens having a plurality of lens groups.

2. Description of Relevant Art

Conventionally, a compact camera provided with a lens shutter type zoom lens has been used extensively. Many of the commercialized cameras are made thinner and more compact by retracting the zoom lens barrel in a collapsed position beyond a focal length variable region of the zoom lens when a photograph is not taken, so that the top end portion of the lens will not protrude from the camera main body. Most of these types of cameras adopt a focus adjusting method, in which focus adjustment is effected by adjusting a relative positional relation of the lens groups that constitute the zoom lens at their respective zooming positions (focal distance positions). For example, in case of a so-called dual-group zoom lens, the focus adjustment is effected by adjusting the position of the rear lens group with respect to the front lens group.

However, with the above focus adjusting method, the relative position of the rear lens group with respect to the front lens group may be displaced from the position where it is supposed to be, and even a slight displacement can give an enormous adverse effect to the resolution of the lens. For this reason, in order to obtain a satisfactory image, it is necessary to maintain the relative positions of the lens groups accurately. Thus, highly accurate-components and assembly are required, which makes it difficult to manufacture inexpensive cameras.

SUMMARY OF THE INVENTION

The present invention is devised to solve the above problems, and therefore, has an object to provide a camera capable of obtaining stable resolution and saving the cost.

In order to fulfill the above object, a first camera of cameras of the present invention is a camera provided with a zoom lens having a plurality of lens groups for forming an image of a subject on a predetermined image forming plane by the zoom lens, characterized by comprising: a first driving source; a second driving source; and a lens driving mechanism for effecting (1) a focusing operation by driving the first driving source while maintaining distances among the plurality of lens groups, and (2) a zooming operation by driving the second driving source while changing the distances among the plurality of lens groups.

With the first camera of the present invention, a picture is taken by effecting the zooming operation by driving the second driving source while changing the distances among the plurality of lens groups, and after a desired magnification is obtained by changing the relative distances among the plurality of lens groups, effecting the focus operation by driving the first driving source while maintaining the distances among the plurality of lens groups. Thus, compared with the prior art, by which the focus adjustment is effected by adjusting the position of the rear lens group with respect to the front lens group, for example, the focusing operation can be effected while maintaining the lens resolution accurately by maintaining the relative positions of these lens groups, thereby making it possible to obtain a picture with stable resolution.

The first camera includes the following embodiment. That is, a camera provided with a zoom lens having a plurality of lens groups for forming an image of a subject on a predetermined image forming plane by the zoom lens, characterized by comprising: a first driving source; a rotatable ring, which is allowed to rotate around an optical axis when driven by the first driving source; a focus cylinder connected to the rotatable ring so as to move linearly in an optical axis direction in association with a rotation of the rotatable ring; a second driving source; a rotationally movable cylinder engaged with the focus cylinder in the optical axis direction so as to move in association with a movement of the focus cylinder in the optical axis direction, and provided rotatably around the optical axis with respect to the focus cylinder in a rotating direction so as to rotate when driven by the second driving source; and a plurality of lens holding frames, each holding their respective lens groups and linked to the rotationally movable cylinder so as to move in the optical axis direction relatively with respect to the rotationally movable cylinder in association with a rotation thereof.

With the camera of the above embodiment, a picture is taken by effecting (1) the zooming operation, wherein each of the plurality of lens groups moves relatively in the optical axis direction in association with a rotation of the rotational movable cylinder by driving the second driving source, and thereby changing the distances among the plurality of lens groups, and (2) the focusing operation while maintaining the distances among the plurality of lens groups in association with a rotation of the rotatable ring that is allowed to rotate around the optical axis when driven by the first driving source. Thus, compared with the prior art, by which the focus adjustment is effected by adjusting the position of the rear lens group with respect to the front lens group, stable resolution can be obtained.

The first camera of the present invention may be arranged in such a manner that the first driving source effects the focusing operation by means of rotational driving, and the focusing operation is effected by driving the first driving source to rotate in a forward direction.

Also, the first camera of the present invention may be arranged in such a manner that the first driving source effects the focusing operation by means of rotational driving, and the focusing operation is effected by driving the first driving source to rotate in an inverse direction.

In this manner, the first camera of the present invention may be arranged so as to effect the focusing operation by means of rotational driving toward the zooming up side or toward the zooming down side.

Further, it is preferable that the focus cylinder retracts the rotationally movable cylinder in a camera main body to a collapsed position where no photograph can be taken.

By arranging the focus cylinder in such a manner so as to retract the rotationally movable cylinder in the camera main body to the collapsed position where no photograph can be taken, the camera can be made thinner and more compact.

Also, in order to fulfill the above object, a second camera of the cameras of the present invention is a camera, characterized by comprising: a zoom lens enclosed therein; and a linking portion for linking a first barrel assembly for varying a focal length by changing a relative positional relation in an optical axis direction among a plurality of lens groups forming the zoom lens to a second barrel assembly for changing a position of the first barrel assembly in the optical axis direction with respect to a shooting focus plane, wherein the second barrel assembly is driven first by using a driving force of a driving source, and thence the driving force from the second barrel assembly is delivered to the first barrel assembly through the linking portion.

The second camera includes the following embodiment. That is, a camera, characterized by comprising: a zoom lens enclosed therein; and a linking portion for linking a first barrel assembly for varying a focal length by changing a relative positional relation in an optical axis direction among a plurality of lens groups forming the zoom lens to a second barrel assembly for changing a position of the first barrel assembly in the optical axis direction with respect to a shooting focus plane, wherein: the second barrel assembly is driven first by using a driving force of a single driving source, and thence the driving force is delivered to the first barrel assembly by driving the second barrel assembly; a driving force non-delivering region where the driving force is not delivered is formed within the linking portion of the first barrel assembly and second barrel assembly; and a focus adjustment is effected while the second barrel assembly alone is driven within the driving force non-delivering region.

With the second camera of the above embodiment, the focus adjustment is effected in the driving force non-delivering region while maintaining the relative positional relation of the plurality of lens groups forming the zoom lens in the optical axis direction. Thus, compared with the prior art, by which the focus adjustment is effected by adjusting the position of the rear lens group with respect to the front lens group, a picture can be obtained while maintaining the lens resolution accurately and stably. Thus, neither highly accurate components nor assembly is necessary, and the cost can be saved. In addition, with the camera of the above embodiment, both the zooming operation and focusing operation can be effected by a single driving source, thereby making the arrangement simpler.

In order to fulfill the above object, the second camera of the present invention also includes the following embodiment. That is, a camera, characterized by comprising: a zoom lens enclosed therein; and a linking portion for linking a first barrel assembly for varying a focal length by changing a relative positional relation in an optical axis direction among a plurality of lens groups forming the zoom lens to a second barrel assembly for changing a position of the first barrel assembly in the optical axis direction with respect to a shooting focus plane, wherein: the second barrel assembly is driven first by using a driving force of a single driving source, and thence the driving force is delivered to the first barrel assembly by driving the second barrel assembly; the camera is provided with a collapsed region, in which both of the first barrel assembly and second barrel assembly are retracted in a camera main body when the camera is not in use, and projected to an outside of the camera main body when the camera is in use; a driving force non-delivering region where the driving force is not delivered is provided within the linking portion; a focus adjustment is effected while the second barrel assembly alone is driven in the driving force non-delivering region; and the driving force non-delivering region is included in the collapsed region.

With the second camera of the above embodiment, the driving force non-delivering region is provided, and the driving force non-delivering region is included in the collapsed region. Hence, the focusing operation is effected while the interval of the plurality of lens group is maintained. Consequently, not only can a picture be obtained while maintaining the lens resolution accurately and stably, but also the camera can be made thinner and more compact.

In the collapsed region, the second camera of the above embodiment may be arranged in such a manner that a driving force of the single driving source in one direction is used to drive the second barrel assembly in a projection direction in the collapsed region, and a driving force of the driving source in another direction is used to effect the focus adjustment.

Also, the second camera of the present invention may be described as follows. That is, the second camera of the present invention is a camera provided with a zoom lens having a plurality of lens groups for forming an image of a subject on a predetermined image forming plane by the zoom lens, characterized by comprising:
 a driving source, which is allowed to be driven in either a forward direction or an inverse direction; and
 a lens driving mechanism for effecting a zooming operation by driving the driving source in a first direction while changing the distances among the plurality of lens groups, and subsequent to the zooming operation, effecting a focusing operation by driving the driving source in a second direction which is opposite to the first direction while maintaining the distances among the plurality of lens groups.

The second camera of the present invention further includes the following embodiment. That is, a camera provided with a zoom lens having a plurality of lens groups for forming an image of a subject on a predetermined image forming plane by the zoom lens, comprising:
 a driving source, which is allowed to be driven in either a forward direction or an inverse direction;
 a first rotational movable cylinder, which moves in an optical axis direction while rotating around an optical axis when driven by the driving source;
 a second rotational movable cylinder engaged with the first rotationally movable cylinder in the optical axis direction so as to move in association with a movement of the first rotationally movable cylinder in the optical axis direction, the second rotational movable cylinder also engaging with the first rotationally movable cylinder in a rotating direction while securing a clearance so as to rotate around the optical axis in association with a rotation of the first rotationally movable cylinder, when the first rotationally movable cylinder inverts a rotating direction, the second rotationally movable cylinder stopping a rotation thereof regardless of a rotation of the first rotationally movable cylinder until the first rotationally movable cylinder rotates for a predetermined angle of rotation, when the first rotationally movable cylinder has rotated for the predetermined angle of rotation, the second rotationally movable cylinder engaging with the first rotationally movable cylinder so as to rotate again in association with a rotation of the first rotationally movable cylinder; and
 a plurality of lens holding frames, each holding their respective lens groups and connected to the second rotationally movable cylinder so as to move in the optical axis direction relatively with respect to the second rotationally movable cylinder in association with a rotation thereof.

It is preferable that the second camera of the above embodiment is arranged in such a manner that a lens barrel including the first rotationally movable cylinder, second rotationally movable cylinder, and the plurality of lens holding frames is allowed to be retracted in a camera main body to a collapsed position where no photograph can be taken.

BRIEF DESCRIPTION OF THE DRAWINGS

FIG. 10 is a flowchart detailing a power source ON program that is run when a power source of the camera is turned ON.

DETAILED DESCRIPTION OF THE PREFERRED EMBODIMENTS

The following description will describe embodiments of the present invention. Of the cameras according to the present invention, an embodiment of a first camera will be explained first, and thence an embodiment of a second camera will be explained.

Figure 1:
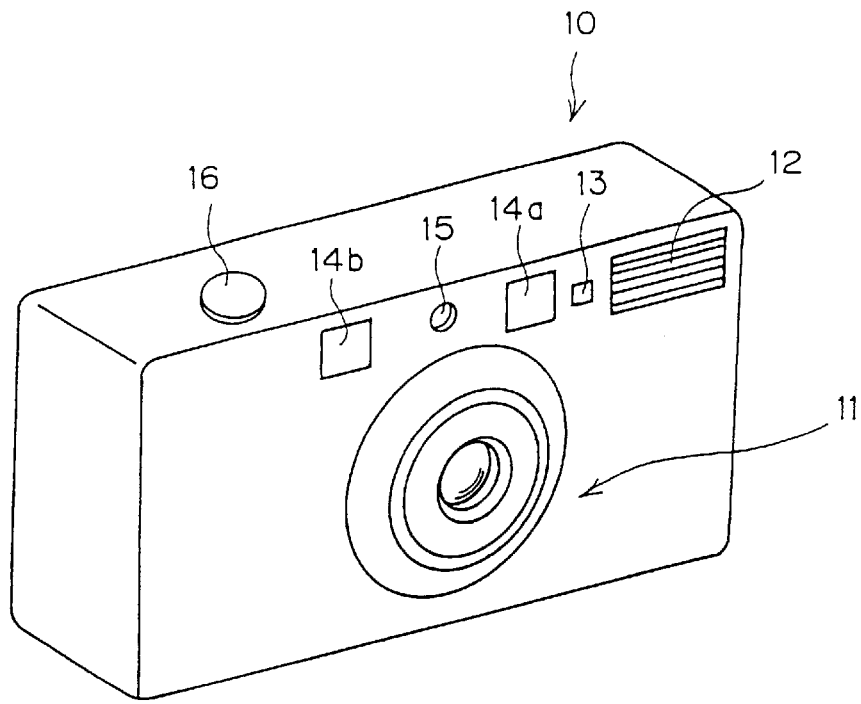
FIG. 1 is a perspective view of one embodiment of a first camera of the present invention, showing a camera provided with a zoom lens in a collapsed state where a zoom lens barrel that supports the zoom lens is retraced in the camera main body.
Figure 2:
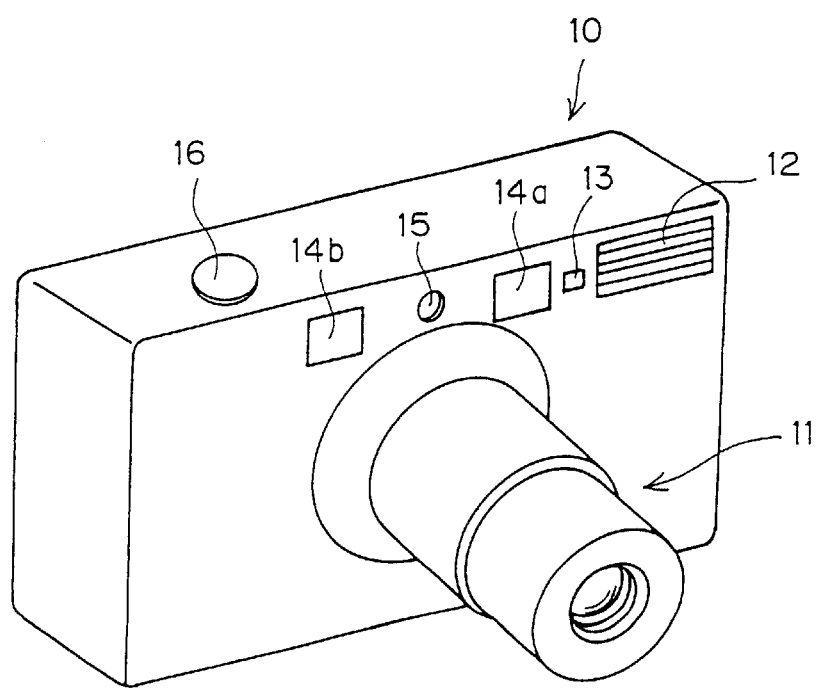
FIG. 2 is a perspective view of the camera shown in FIG. 1, showing a zoom barrel projected state where a zooming operation is effected.

FIG. 1 is a perspective view of one embodiment of a camera of the present invention provided with a zoom lens, showing a collapsed state where a zoom barrel that supports the zoom lens is retracted in the camera main body. FIG. 2 is a perspective view of the camera shown in FIG. 1, showing a maximum projected state where the zoom barrel is projected to the maximum position.

A camera 10 shown in FIGS. 1 and 2 is a camera, which is provided with a zoom lens composed of a plurality of lens groups, and forms an image of a subject on a predetermined image forming plane by effecting a zooming operation and focal length adjustment with the zoom lens. A zoom barrel 11 having the zoom lens inside is provided to the camera 10 at the center of the front surface, and a mechanism referred to as a lens driving mechanism in the present invention is installed in the zoom barrel 11. A light flashing window 12, a finder objective window 13, an AF light emitting window 14a, an AF light receiving window 14b, and an AE light receiving window 15 are provided to the camera 10 at the upper portion of the front surface. Also, a shutter release button 16 is provided to the camera 10 at the top surface. Further, a built-in battery 400 (see FIGS. 9 and 20) is installed in the camera 10 to control overall actions of the camera 10.

In addition, a zooming manipulation lever is provided to the camera 10 at the non-illustrated back surface. While one party of the zooming manipulation lever is kept pushed, the zoom barrel 11 moves to shift from the collapsed state shown in FIG. 1 to the maximum projected state shown in FIG. 2, and while the other party of the zooming manipulation lever is kept pushed, the zoom barrel 11 moves to shift from the maximum projected state shown in FIG. 2 to the collapsed state shown in FIG. 1.

Figure 3:
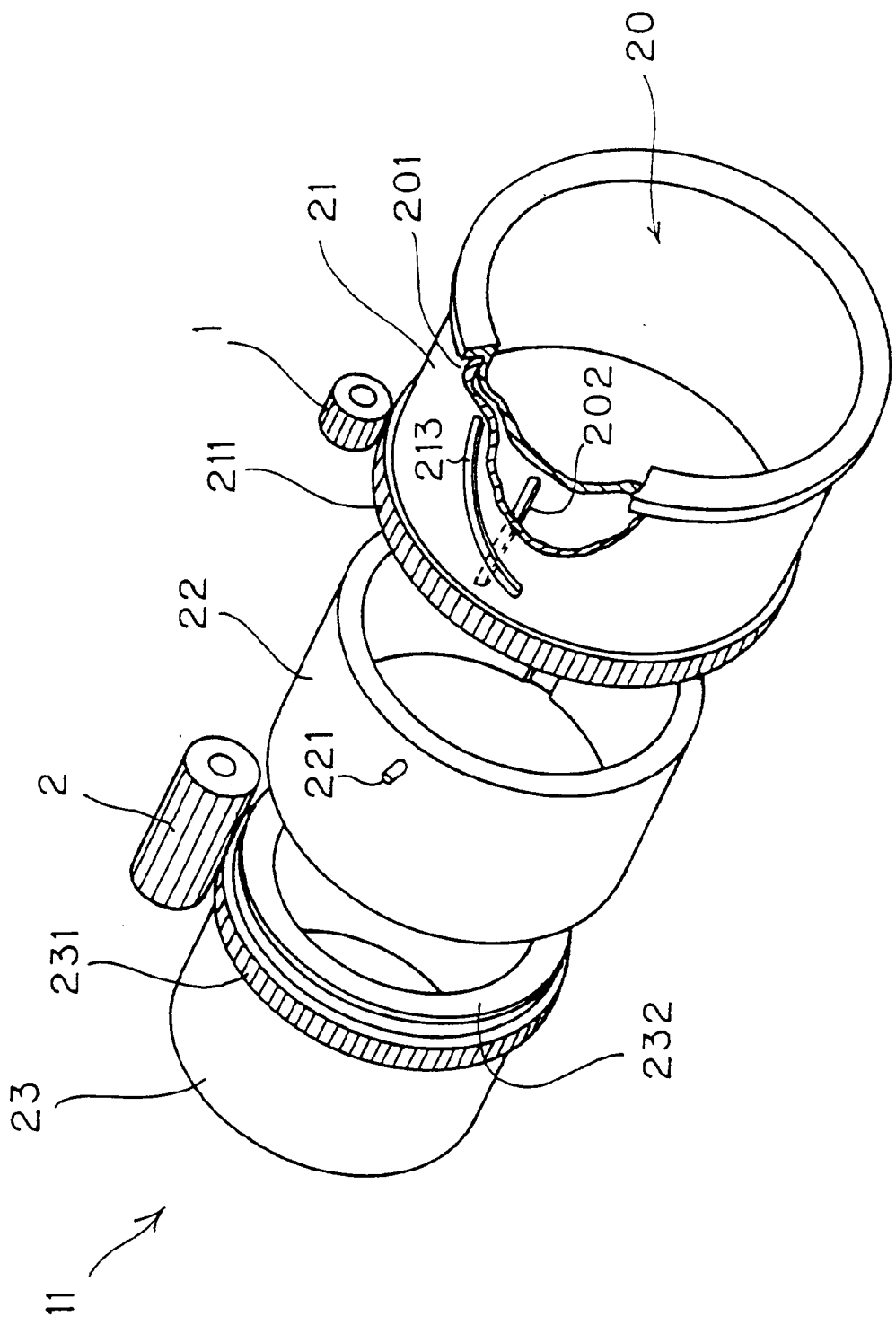
FIG. 3 is an exploded perspective view of the zoom barrel of the camera shown in FIGS. 1 and 2.

FIG. 3 is an exploded perspective view of the zoom barrel of the camera shown in FIGS. 1 and 2.

FIG. 3 shows the zoom barrel 11 provided with a lens driving mechanism for effecting (1) a focusing operation by driving a first driving gear 1 while maintaining distances among a plurality of lens groups, and (2) a zooming operation by driving a second driving gear 2 while changing the distances among the plurality of lens groups. The first and second driving gears 1 and 2 are driven respectively by electric motors 418 and 419 (see FIG. 9), which will be described below. The electric motors 418 and 419 are driven on power supplied from the aforementioned built-in battery 400. The electric motor 418 and the first driving gear 1 are linked to each other by a non-illustrated gear train, and a driving mechanism from the electric motor 418 to the first driving gear 1 corresponds to what is referred to as a first driving source in the first camera of the present invention. Likewise, the electric motor 419 and second driving gear 2 are linked to each other by a non-illustrated gear train, and a driving mechanism from the electric motor 419 to the second driving gear 2 corresponds to what is referred to as a second driving source in the first camera of the present invention.

The zoom barrel 11 includes: a fixed cylinder 20 fixed to the camera main body; a rotatable ring 21 that is allowed to rotate around an optical axis when driven by the first driving gear 1; a focus cylinder 22 linked to the rotatable ring 21 so as to move linearly in the optical axis direction in association with a rotation of the rotatable ring 21; and a rotationally movable cylinder 23 engaged with the focus cylinder 22 in the optical axis direction so as to move in association with a movement of the focus cylinder 22 in the optical axis direction, and provided rotatably around the optical axis with respect to the focus cylinder 22 in the rotating direction so as to rotate when driven by the second driving gear 2.

The fixed cylinder 20 includes a fitting rotary groove 201 to which the rotatable ring 21 is fitted, and a linearly moving key groove 202 extending in the optical axis direction.

The rotatable ring 21 includes a cam groove 213, which is provided diagonally with respect to the optical axis direction and overlaps the linearly moving key groove 202 partially. Also, the rotatable ring 21 includes an engaging driving gear 211, which is engaged with the first driving gear 1.

The focus cylinder 22 includes a cam pin 221 formed upright on the outside wall thereof. The cam pin 221 is inserted through the overlapping portion of the linearly moving key groove 202 and cam groove 213. The focus cylinder 22 retracts the rotationally movable cylinder 23 in the camera main body at the collapsed position where no photograph can be taken.

The rotationally movable cylinder 23 includes a rotary linking portion 232 linked to the focus cylinder 22 and an engaging driving gear 231, which is engaged with the second driving gear 2.

Figure 4:
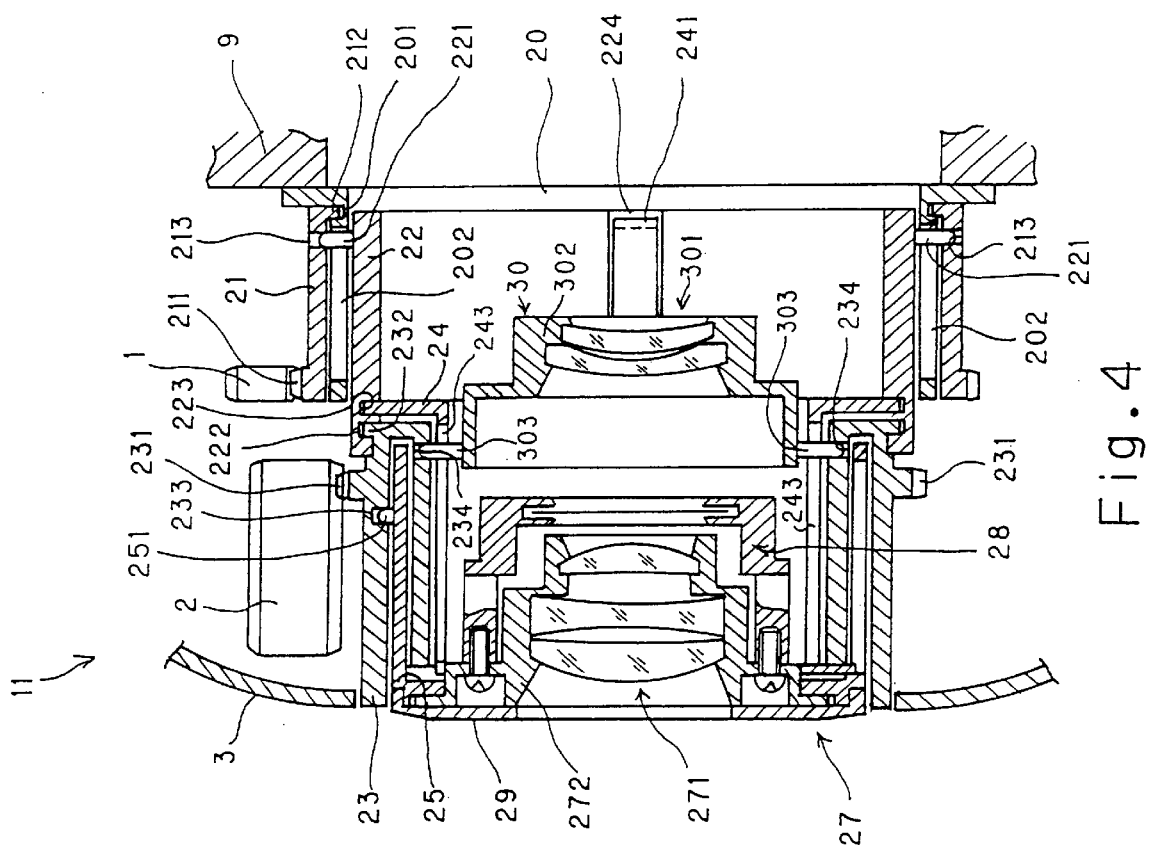
FIG. 4 is a cross section of the camera shown in FIG. 1, showing the collapsed state where the zoom barrel is retracted in the camera main body.

FIG. 4 is a cross section of the camera shown in FIG. 1, showing a collapsed state where the zoom barrel is retracted in the camera main body.

The zoom barrel 11 shown in FIG. 4 includes a front group supporting frame 272 and a rear group supporting frame 302 (collectively corresponding to what are referred to as a plurality of lens holding frames in the present invention) which respectively hold a front group lens unit 271 and a rear group lens unit 301 (collectively corresponding to what are referred to as a plurality of lens groups in the present invention), and the both frames are linked to the rotationally movable cylinder 23 through their respective cam mechanisms so as to move in the optical axis direction relatively with respect to the rotationally movable cylinder 23 in association with a rotation thereof.

The engaging driving gear 211 provided to the rotatable ring 21 is engaged with the first driving gear 1, and when the first driving gear 1 rotates, a rotational driving force is delivered to the engaging driving gear 211, whereby the rotatable ring 21 starts to rotate around the optical axis. The rotatable ring 21 is a ring member surrounding the outer circumference of the fixed cylinder 20 fixed to the camera main body 9. The fitting rotary groove 201 of the fixed cylinder 20 is fitted with a rotary linking portion 212 of the rotatable ring 21. Also, the cam pin 221 formed upright on the outside wall of the focus cylinder 22 is inserted through both the linearly moving key groove 202 of the fixed cylinder 20 and the cam groove 213 of the rotatable ring 21. Also, the cam pin 221 is allowed to slide in the optical axis direction by the cam groove 213 in association with a rotation of the rotatable ring 21.

The focus cylinder 22 includes, at the top end portion, a fitting rotary groove 223 to which the end portion of a linearly moving key ring 24 is fitted, and a fitting rotary groove 222 to which the rotary linking portion 232 of the rotationally movable cylinder 23 is fitted. Also, a linearly moving key groove 224 is formed on the inside wall of the focus cylinder 22, to which a linearly moving key 241 provided to the linearly moving key ring 24 is fitted. The linearly moving key ring 24 is formed in the shape of a cylinder along the inside wall surface of the rotationally movable cylinder 23, and a slit of a linearly moving key groove 243 is formed at the corresponding portion in such a manner so as to penetrate through the inside wall surface and outside wall surface while extending linearly in the optical axis direction. Further, the front group lens unit 271 and a shutter unit 28 are attached to a linearly movable cylinder 25 serving as a main supporting body of a front group unit 27 at the further interior of the linearly moving key ring 24. A cam pin 251 is formed upright on the outside wall of the linearly movable cylinder 25, which engages with a cam groove 233 formed on the inside wall surface of the rotationally movable cylinder 23. Further, a cam pin 303 is formed upright on the outside wall of the rear group supporting frame 302 of a rear group unit 30. The cam pin 303 is inserted through the linearly moving key groove 243 provided to the linearly moving key ring 24, and engages with the cam groove 234 formed on the inside wall surface of the rotationally movable cylinder 23. In addition, a lens name plate 29 is attached to the front surface of the linearly movable cylinder 25. FIG. 4 shows a front cover 3 attached to the top and bottom of the linearly movable cylinder 25.

A power source is supplied to the camera 10 arranged in the above manner, whereupon the first driving gear 1 alone starts to rotate in a predetermined direction (forward rotating direction), and a rotational driving force is delivered to the rotatable ring 21 through the driven gear 211, whereby the rotatable ring 21 starts to rotate around the optical axis. Further, the cam pin 221 of the focus cylinder 22 inserted through the overlapping portion of the linearly moving key groove 202 and the cam groove 213 moves linearly in the optical axis direction (toward the left in FIG. 4) by the cam groove 213 in association with a rotation of the rotatable ring 21. In this manner, the zoom barrel 11 in the collapsed state is projected.

Figure 5:
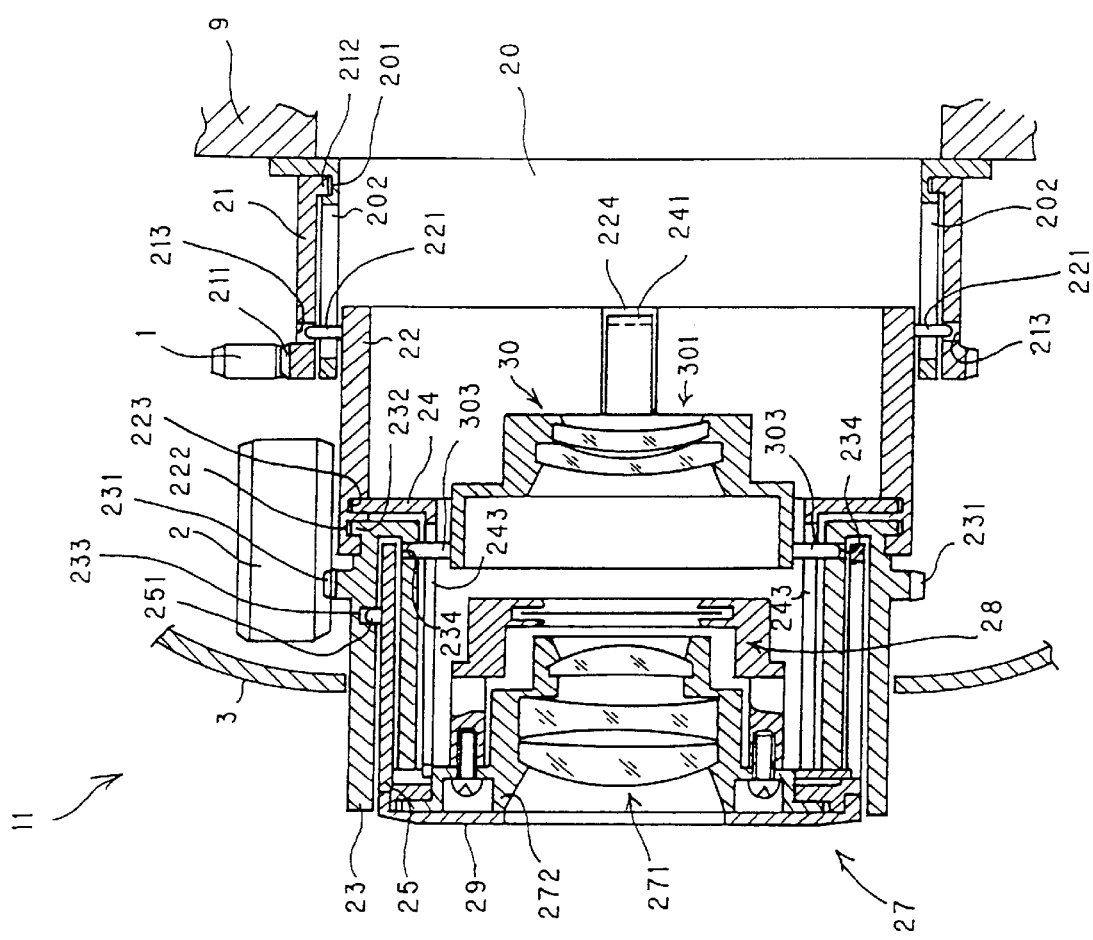
FIG. 5 is a cross section of the camera shown in FIG. 1, showing the projected state where the zoom barrel is projected from the camera main body.

FIG. 5 is a cross section of the camera shown in FIG. 1, showing a state where the zoom barrel is projected from the camera main body.

When the power source is supplied and the zoom barrel 11 is projected, as shown in FIG. 5, the relative positions of the front group lens unit 271 and rear lens group unit 301 are the same as those of the front group lens unit 271 and rear lens group unit 301 in the collapsed state shown in FIG. 4. When the zooming manipulation lever is manipulated toward the telephoto terminus, the zooming operation (zooming up operation) toward the telephoto terminus is effected.

Figure 6:
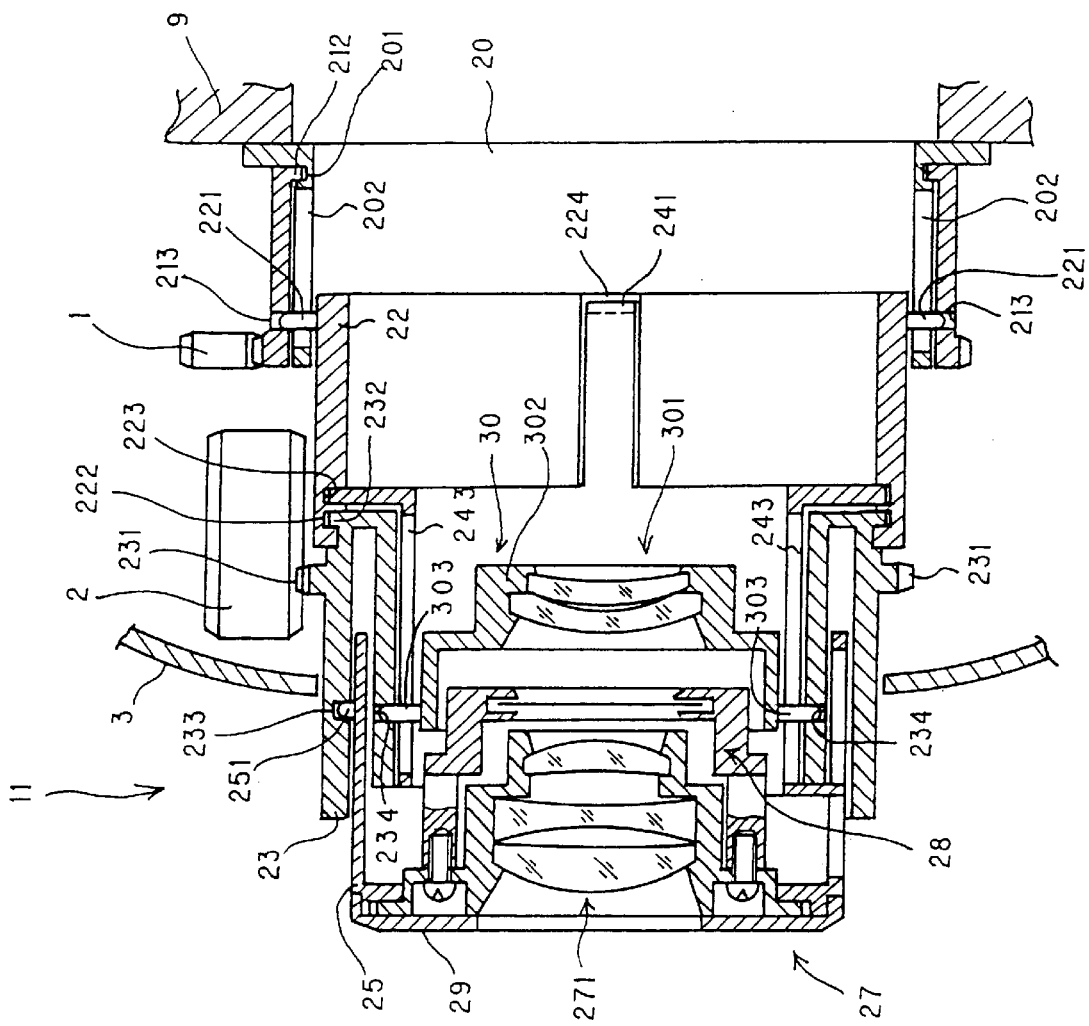
FIG. 6 is a cross section of the camera shown in FIG. 1, showing a state where a zooming operation is effected.

FIG. 6 is a cross section of the camera shown in FIG. 2, showing a state where the zooming operation is effected.

By this zooming operation, the second driving gear 2 alone rotates in a predetermined direction (forward rotating direction), and a rotational driving force is delivered to the rotationally movable cylinder 23 through the driven gear 231, whereby the rotationally movable cylinder 23 starts to rotate around the optical axis. Accordingly, the cam pin 251 moves in the optical axis direction (toward the left in FIG. 6) in accordance with a predetermined path pattern of the cam groove 233 provided to the rotationally movable cylinder 23, whereby the linearly movable cylinder 25 is projected in the optical axis direction. In addition, because the cam groove 234 formed on the inside wall surface of the rotationally movable cylinder 23 and having another path pattern engages with the cam pin 303, the rear group unit 30 also moves in the optical axis direction in accordance with the latter path pattern. In this manner, the zooming operation by the zoom barrel 11 is effected.

Figure 7:
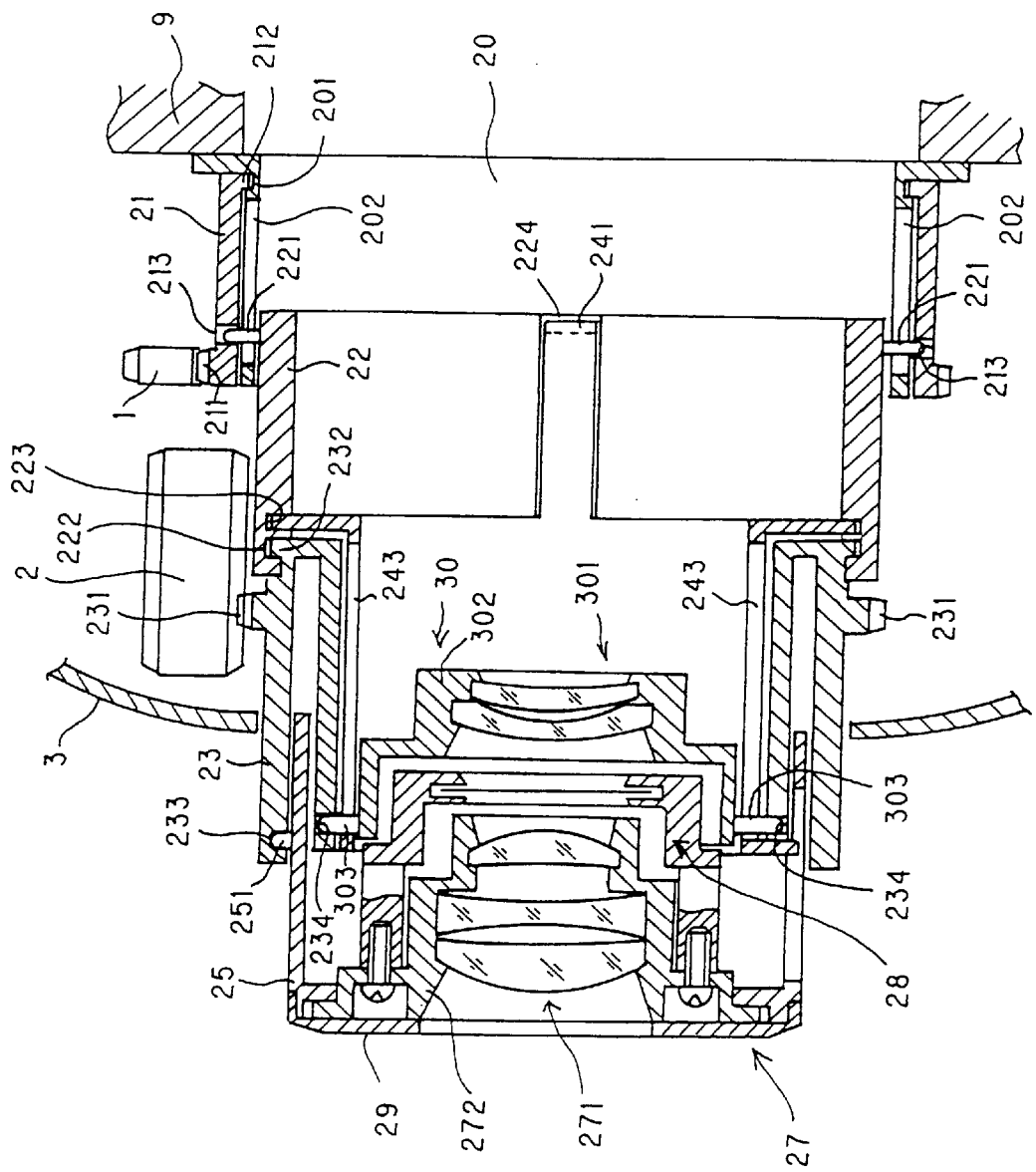
FIG. 7 is a cross section of the camera shown in FIG. 1, showing a state where a further zooming operation is effected in the zooming operation effected state shown in FIG. 6.

FIG. 7 is a cross section of the camera shown in FIG. 1, showing a state where a further zooming operation is effected in the zooming operation effected state shown in FIG. 6.

When the second driving gear 2 alone rotates further in the forward direction in the state where the zooming operation shown in FIG. 6 is effected, the rotationally movable cylinder 23 further rotates around the optical axis, whereby the cam pin 251 moves further in the aforementioned optical axis direction (toward the left in FIG. 7) in accordance with the predetermined path pattern of the cam groove 233 provided to the rotationally movable cylinder 23. Hence, the linearly movable cylinder 25 is projected further. In addition, the rear group moving cam pin 303 also moves further in the optical axis direction in accordance with the path pattern of the cam groove 234 formed on the inside wall surface of the rotationally movable cylinder 23. Hence, the rear group unit 30 also moves further in the optical axis direction. In this manner, a further zooming operation by the zoom barrel 11 is effected.

On the other hand, when the zooming manipulation lever is manipulated toward the wide angle terminus, a zooming operation toward the wide angle terminus (zooming down operation) is effected. By this zooming down operation, the second driving gear 2 alone rotates inversely, and a rotational driving force is delivered to the rotationally movable cylinder 23 through the driving gear 231, whereby the rotationally movable cylinder 23 starts to rotate around the optical axis. Consequently, the cam pin 251 moves in the optical axis direction (toward the right in FIG. 6) inversely to the direction in the case of the zooming up operation in accordance with the path pattern of the cam groove 233 provided to the rotationally movable cylinder 23. Hence, the linearly movable cylinder 25 moves in that optical axis direction. In addition, because the cam groove 234 of the rotationally movable cylinder 23 engages with the cam pin 303, the rear group unit 30 also moves in that optical axis direction in accordance with the path pattern of the cam groove 234. In this manner, the zoom barrel 11 is moved to the initial projected state shown in FIG. 5.

FIG. 7 is a cross section of the camera shown in FIG. 2, showing a state where a further zooming operation is effected in the zooming operation effected state shown in FIG. 6.

When the second driving gear 2 alone rotates further in the forward direction in the foregoing zooming effected state shown in FIG. 6, the rotationally movable cylinder 23 also rotates further around the optical axis, whereby the cam pin 251 moves further in the aforementioned optical axis direction (toward the left in FIG. 7) in accordance with the predetermined path pattern of the cam groove 233 provided to the rotationally movable cylinder 23. Hence, the linearly movable cylinder 25 is projected further. In addition, the rear group moving cam pin 303 also moves further in that optical axis direction in accordance with the path pattern of the cam groove 234 formed on the inside wall surface of the rotationally movable cylinder 23. Hence, the rear group unit 30 also moves further in that optical axis direction. In this manner, a further zooming operation by the zoom barrel 11 is effected.

Figure 8:
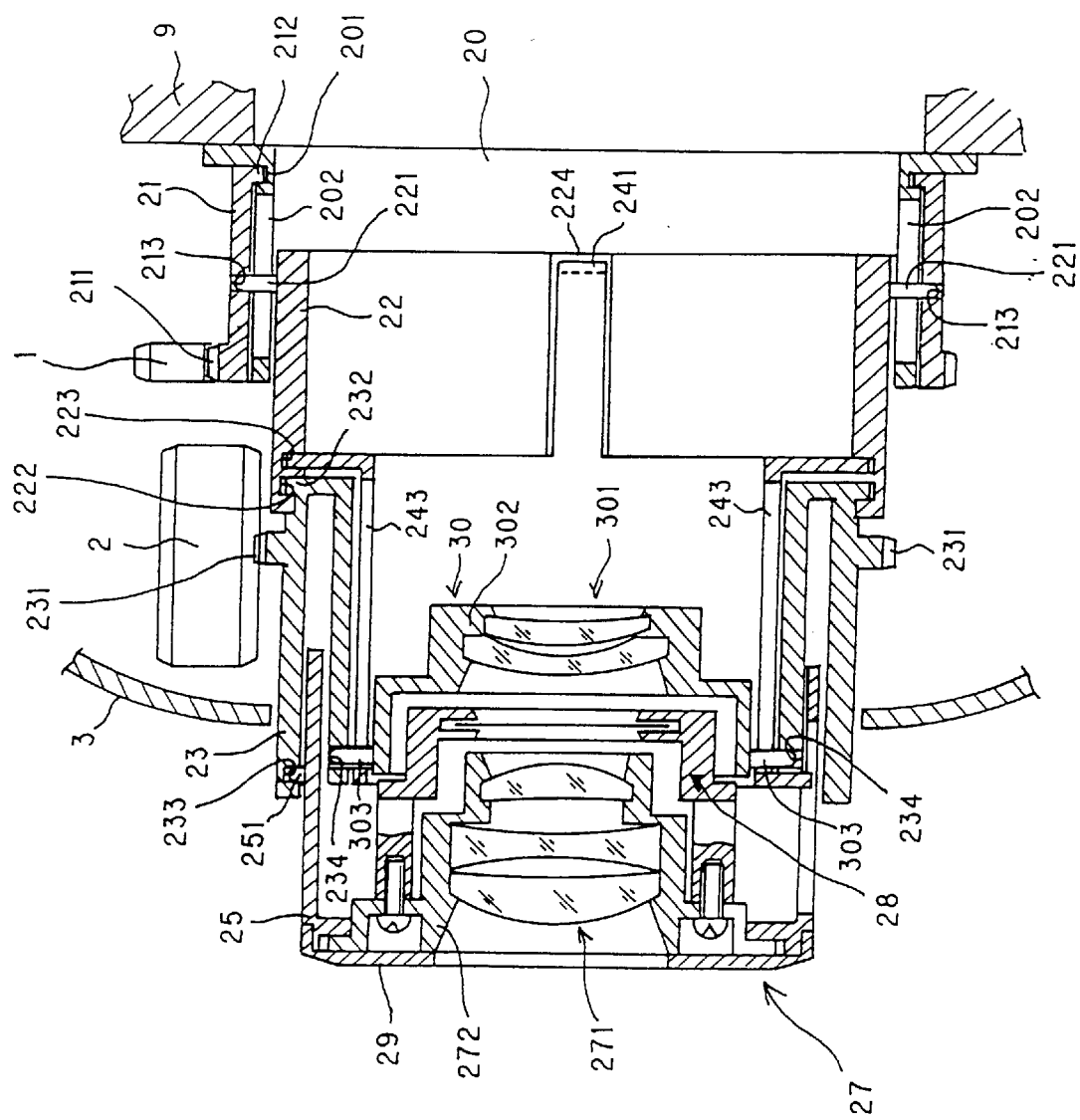
FIG. 8 is a cross section of the camera shown in FIG. 1, showing a state where a focusing operation is effected when a shutter release button is pressed in the zooming operation effected state shown in FIG. 7.

FIG. 8 is a cross section of the camera shown in FIG. 1, showing a state where the shutter release button is pressed and a focusing operation is effected in the zooming operation effected state shown in FIG. 7.

When the shutter release button 12 is pressed in the zooming operation effected state shown in FIG. 7, a distance to a subject is measured by an active type auto-focus device installed in the camera 10 before the shutter actually opens and closes, and focus adjustment is effected by adjusting a travel amount in accordance with a control signal from an AF signal representing the measured distance. More specifically, the first driving gear 1 alone rotates inversely, and a rotational driving force is delivered to the rotatable ring 21 through the driving gear 211, whereby the rotatable ring 21 starts to rotate around the optical axis. Then, the cam pin 221 that is provided to the focus cylinder 22 and inserted through the overlapping portion of the linearly moving key groove 202 and cam groove 213 moves in the optical axis direction (toward the right in FIG. 8) by the cam groove 213 in association with a rotation of the rotatable ring 21. Hence, the focus cylinder 22 moves in the same optical axis direction. Here, because the fitting rotary groove 222 of the focus cylinder 22 is linked to the rotary linking portion 232 of the rotationally movable cylinder 23, the rotationally movable cylinder 23 moves in the same optical axis direction. Further, because the rotationally movable cylinder 23 is also engaged with the rear group unit 30 having the rear group lens unit 301, the rear group unit 30 moves together in the same optical axis direction. In addition, because the cam groove 233 of the rotationally movable cylinder 23 is engaged with the cam pin 251 of the linearly movable cylinder 25, the linearly movable cylinder 25 also moves in the same optical axis direction. Accordingly, the front group unit 27 also moves in the same optical axis direction. In this manner, the focus adjustment is effect by allowing the front group unit 27 and rear group unit 30 to move in the same optical axis direction as one body, in other words, by the action that returns the entire zoom lens toward the camera main body 9. For this reason, the relative positions of the front group lens unit 271 and rear group lens unit 301 are the same as those of the front group lens unit 271 and rear group lens unit 301 in the foregoing zooming operation effected state shown in FIG. 7.

As has been discussed, a picture is taken by the camera 10 of the present embodiment by effecting the zooming operation by the second driving gear 2 while changing a distance between the two lens groups (front group lens unit 271 and rear group lens unit 301), and after a desired magnification is achieved by changing an absolute distance of the two lens groups a relative distance between the two lens groups, by effecting the focusing operation by the first driving gear 1 while maintaining the distance between the two lens groups. Thus, according to the prior art that effects the focus adjustment by adjusting the position of the rear lens group with respect to the front lens group, a slight displacement caused by an error in the relative positions of these lens groups occurring from inaccuracy of the components and assembly reduces the resolution of the lens, thereby making it difficult to obtain a satisfactory image. However, in the present embodiment, because the focusing operation is effected while the lens resolution is maintained accurately by maintaining the relative positions of all the lens groups, a picture with stable resolution can be obtained. Consequently, neither highly accurate components nor assembly is necessary, thereby making it possible to save the cost.

According to the focusing operation in the foregoing embodiment, the focus adjustment is effected by retracting the focus cylinder 22 for a predetermined amount by rotationally moving the first driving gear 1 and rotationally movable cylinder 23 inversely. In this case, the stroke of the cam groove 213 includes the region for the focusing operation in such a manner so as to overlap the projected region of the focus cylinder 22 for the zooming operation. Besides this driving method, a function same as that of the first camera of the present invention can be achieved by another unillustrated embodiment, which will be explained below.

That is, the focus adjustment is effected by moving forward the focus cylinder 22 for a predetermined amount by rotationally moving the first driving gear 1 and rotationally movable cylinder 23 in the direction in which the focus cylinder 22 is projected, namely, in the forward direction. In this case, the stroke of the cam groove 213 forms the region for the focusing operation outside of the projected region of the focus cylinder 22 for the zooming operation.

Figure 9:
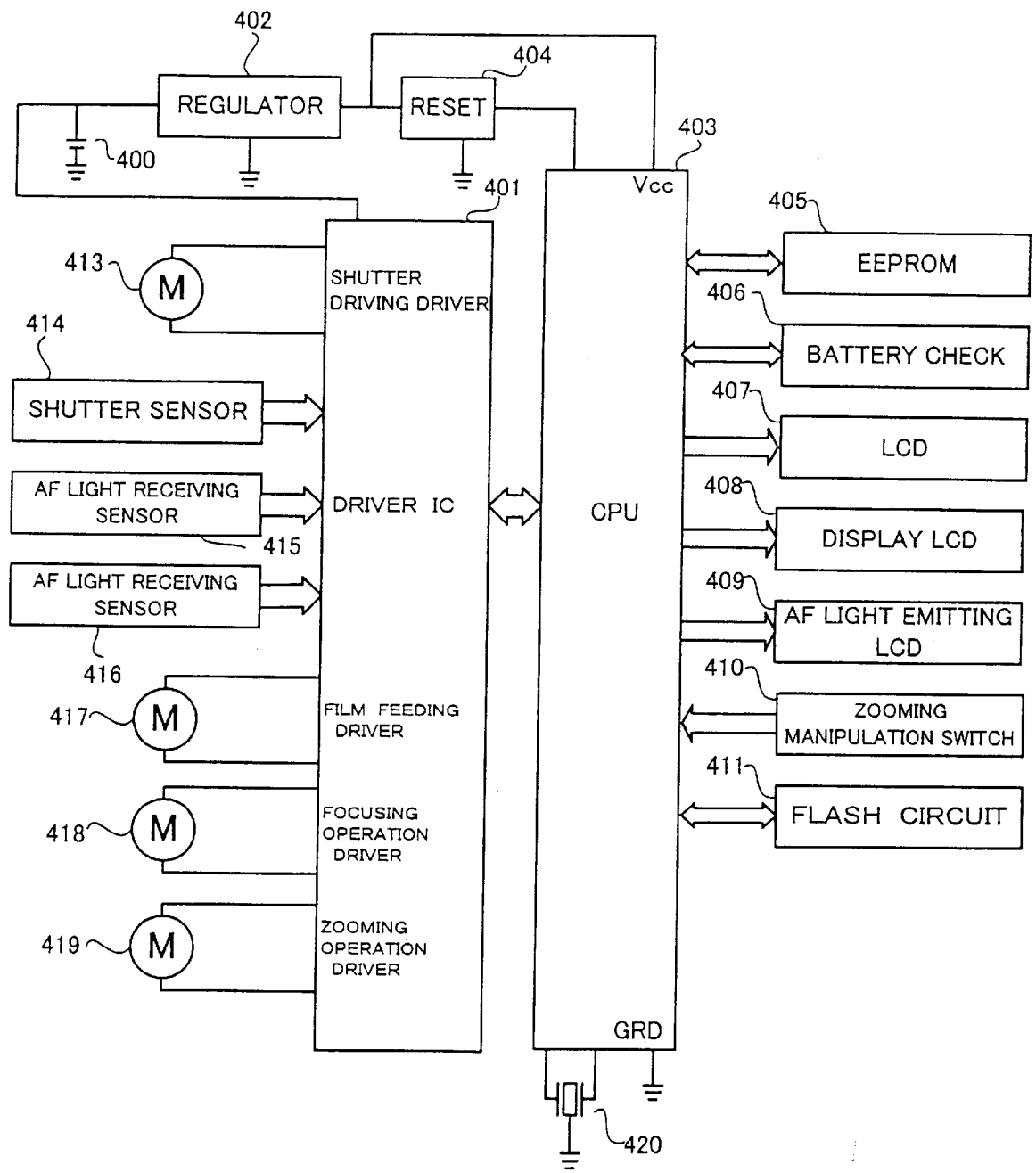
FIG. 9 is a circuit diagram of the camera shown in FIG. 1.

FIG. 9 is a block diagram of the camera of the present embodiment.

The camera 10 includes the built-in battery 400, and power from the built-in battery 400 is supplied directly to a driver IC 401, and to a CPU 403 stably by way of a regulator 402. An output voltage from the regulator 402 is monitored by a reset circuit 404. When the output voltage from the regulator 402 drops to a lower limit voltage at which the CPU 403 can no longer operate normally, the reset circuit 404 deactivates the CPU 403 so as to forestall runaway of the camera 10.

The CPU 403 is connected to an EEPROM 405 for storing programs run by the CPU 403 and data, a battery checking circuit 406 for monitoring an available capacity of the built-in battery 400, a finder's liquid crystal display (LCD) 407 for displaying various kinds of information within the finder, a display LED 408, an AF (Auto-Focus) light emitting LED 409, a zooming manipulation switch 410 for switching ON/OFF in accordance with manipulation of the zooming manipulation lever provided at the back surface of the camera 10, and a flash circuit 411. The CPU 403 receives commands or information from the foregoing connected destinations separately or effects a control thereon. Also, the CPU 403 is connected to a crystal oscillator 420 for generating a basic clock that is necessary for the CPU 403 to operate. Further, the CPU 403 is connected to the foregoing driver IC 401, and the driver IC 401 drives electric motors 413, 417, 418, and 419 at commands from the CPU 403. Furthermore, the driver IC 401 is connected to a shutter sensor 414 for sensing the timing at which the shutter starts to open, an AE light receiving sensor 415 for sensing brightness of a subject field, and an AF light receiving sensor 416 for measuring a distance to a subject.

The driver IC 401 encloses a shutter driving driver for driving the shutter opening/closing electric motor 413, and the shutter driving driver drives the shutter opening/closing electric motor 413 at a command from the CPU 403, so that the shutter is opened at the opening timing detected by the shutter sensor 414 and closed at the timing corresponding to the information as to the brightness of the subject field detected by the AE light receiving sensor 415, whereby a frame of photograph is taken.

The driver IC 401 enclose a film feeding driver, a focusing operation driver, and a zooming operation driver to drive the film feeding electric motor 417, focusing operation electric motor 418, and zooming operation electric motor 419, respectively.

The film feeding driver drives the electric motor 417 at a command from the CPU 403. More specifically, for example, when a frame of photograph is taken, a picture film is wound up for a frame, or when the last frame is used, the picture film is wound back in the film patrone (not shown).

Also, the focusing operation driver drives the electric motor 418 in accordance with a distance measuring result of the AF light receiving sensor 416, and effects the focusing operation to adjust a focus.

Further, the zooming operation driver drives the electric motor 419 at a command from the CPU 403 when it detects the ON/OFF switching action of the zooming manipulation switch 410 in response to the manipulation of the zooming manipulation lever, so that the zoom barrel 11 (see FIGS. 1 and 2) is moved toward the telephoto terminus or wide angle terminus.

Figure 10:
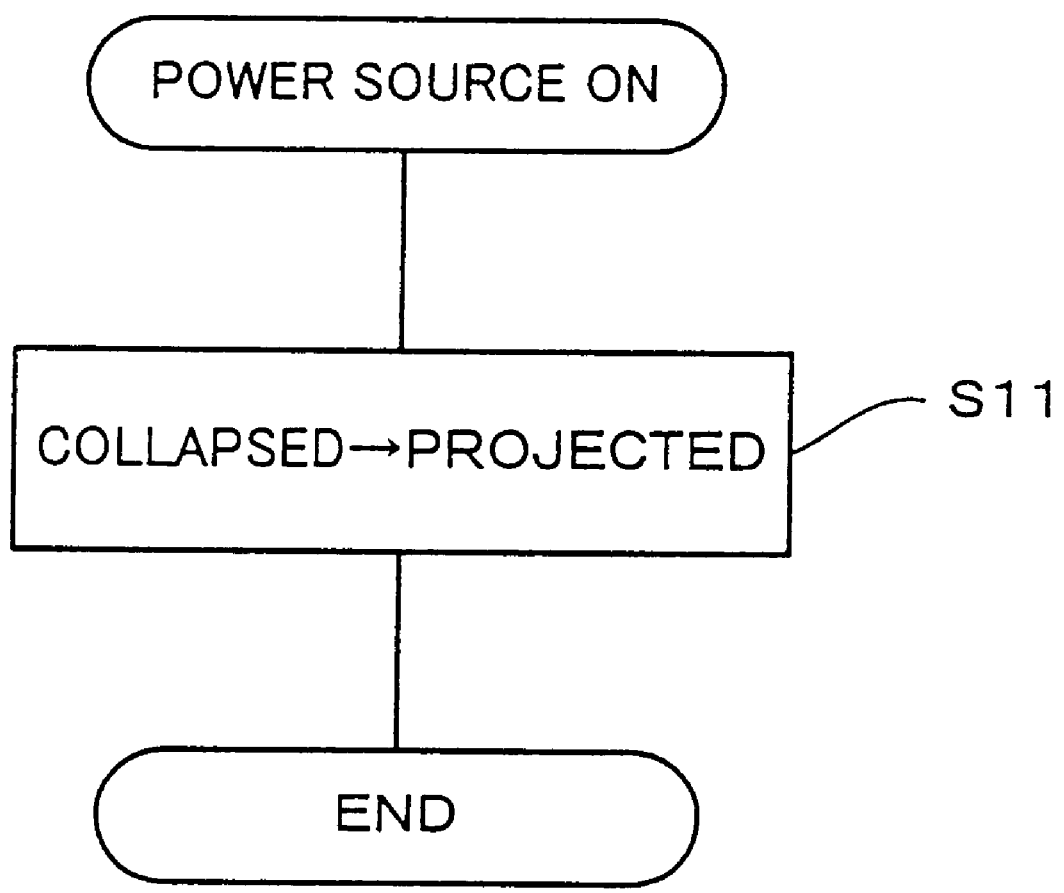

FIG. 10 is a flowchart detailing a power source ON program that is run when the power source of the camera is turned ON.

This program is run in the CPU 403 shown in FIG. 9. When the power source of the camera 10 is turned ON, the electric motor 418 shown in FIG. 9 is driven in Step S11, and a driving force of the electric motor 418 is delivered to the first driving gear 1, whereby the first driving gear 1 starts to rotate in the forward direction. Consequently, the foregoing collapsed state shown in FIG. 4 shifts to the projected state shown in FIG. 5, whereupon the routine is terminated.

Figure 11:
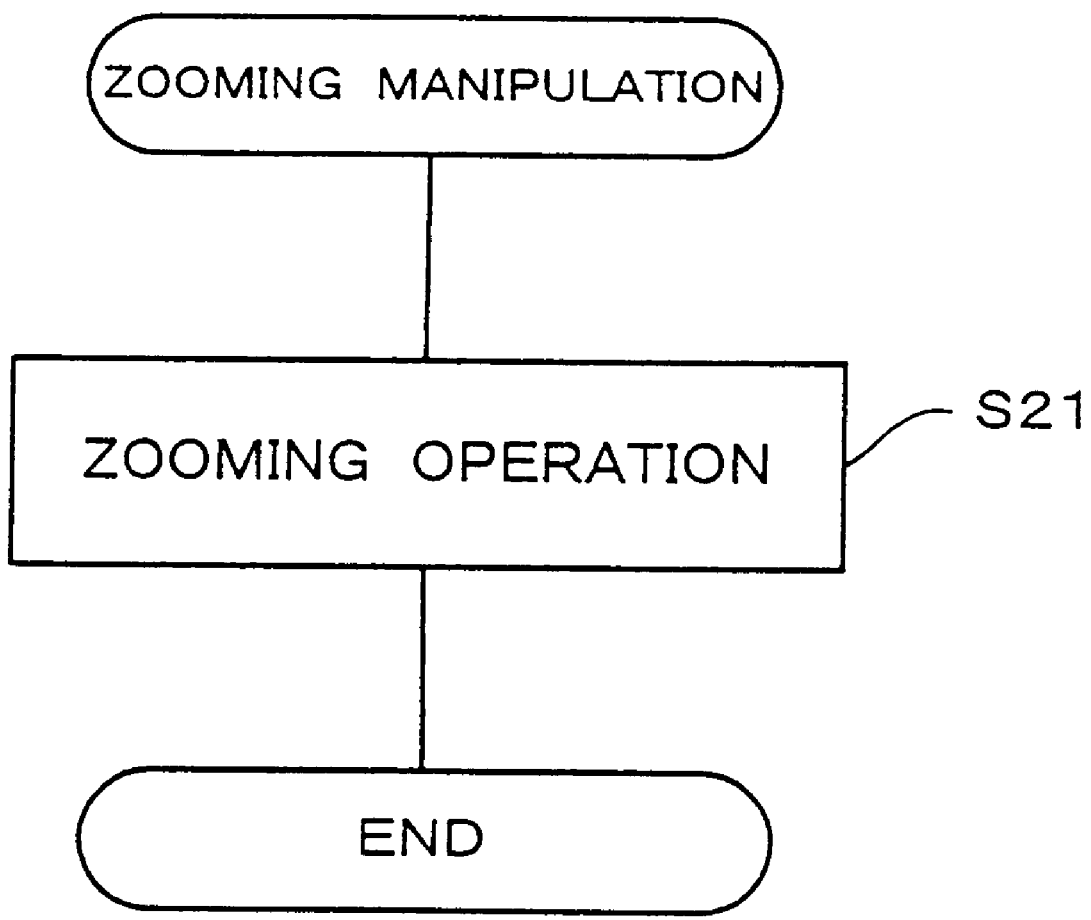
FIG. 11 is a flowchart detailing a zooming manipulation program.

FIG. 11 is a flowchart detailing a zooming manipulation program.

When a zooming operation command is issued by manipulation of the zooming manipulation switch 410 (see FIG. 9), the electric motor 419 shown in FIG. 9 starts to drive in Step S21, and a driving force of the electric motor 419 is delivered to the second driving gear 2, whereby the zooming operation is effected and the routine is terminated. Consequently, the foregoing projected state shown in FIG. 5 shifts to the zooming state shown in FIGS. 6 and 7.

Figure 12:
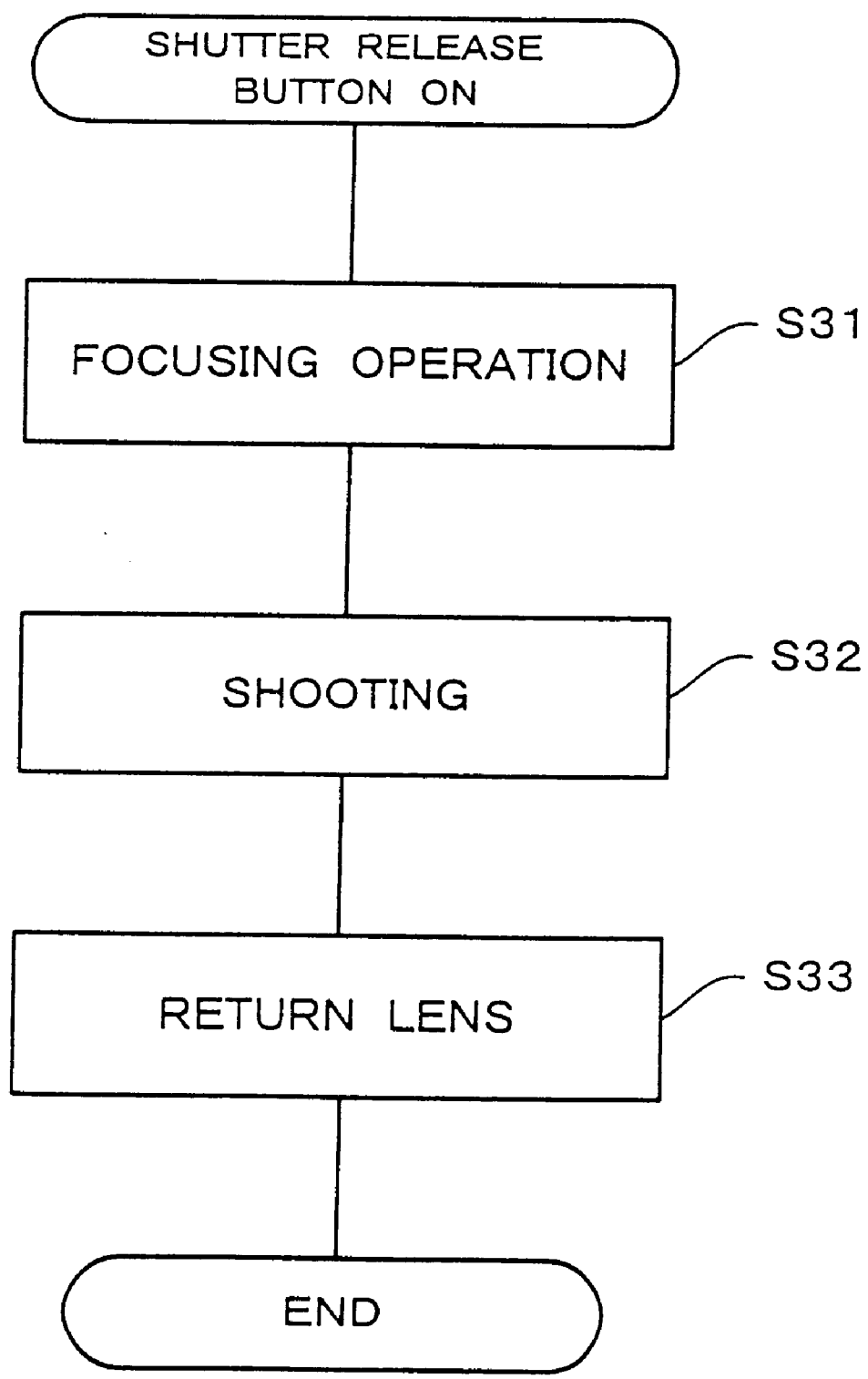
FIG. 12 is a flowchart detailing a shutter release button ON program that is run when a shutter release button of the camera is pressed.

FIG. 12 is a flowchart detailing a shutter release button ON program that is run when the shutter release button of the camera is pressed.

When the shutter release button of the camera 10 is pressed, the focusing operation in Step S31 is effected as a light measuring operation for measuring brightness of a subject to be taken is effected, while a distance to the subject is measured by the auto-focus device. In this focusing operation, the electric motor 418 starts to drive based on the control signal from the AF signal that represents the measured distance, so that the first driving gear 1 is rotated inversely to perform an action that returns the position of the entire zoom lens toward the camera main body 9. Consequently, the focus adjustment is effected by changing the position of the entire zoom lens with respect to the focus plane.

Next, in Step S32, whether a flash light should be flashed or not is determined based on a light quantity obtained by the light measuring operation. When it is determined that the light flashing is not necessary, the shutter is operated, and the flow proceeds to Step S33. On the other hand, when it is determined that the light flashing is necessary, a series of operations including shutter opening, light flashing, and the shutter closing are performed, and the flow proceeds to Step S33. In Step S33, the electric motor 418 is driven to rotate the first driving gear 1 in the forward direction, so that the entire zoom lens is returned to the position where it was before the shooting to prepare for the next shooting. Also, the electric motor 417 is driven to wind up the picture film for one frame, whereupon the routine is terminated.

Figure 13:
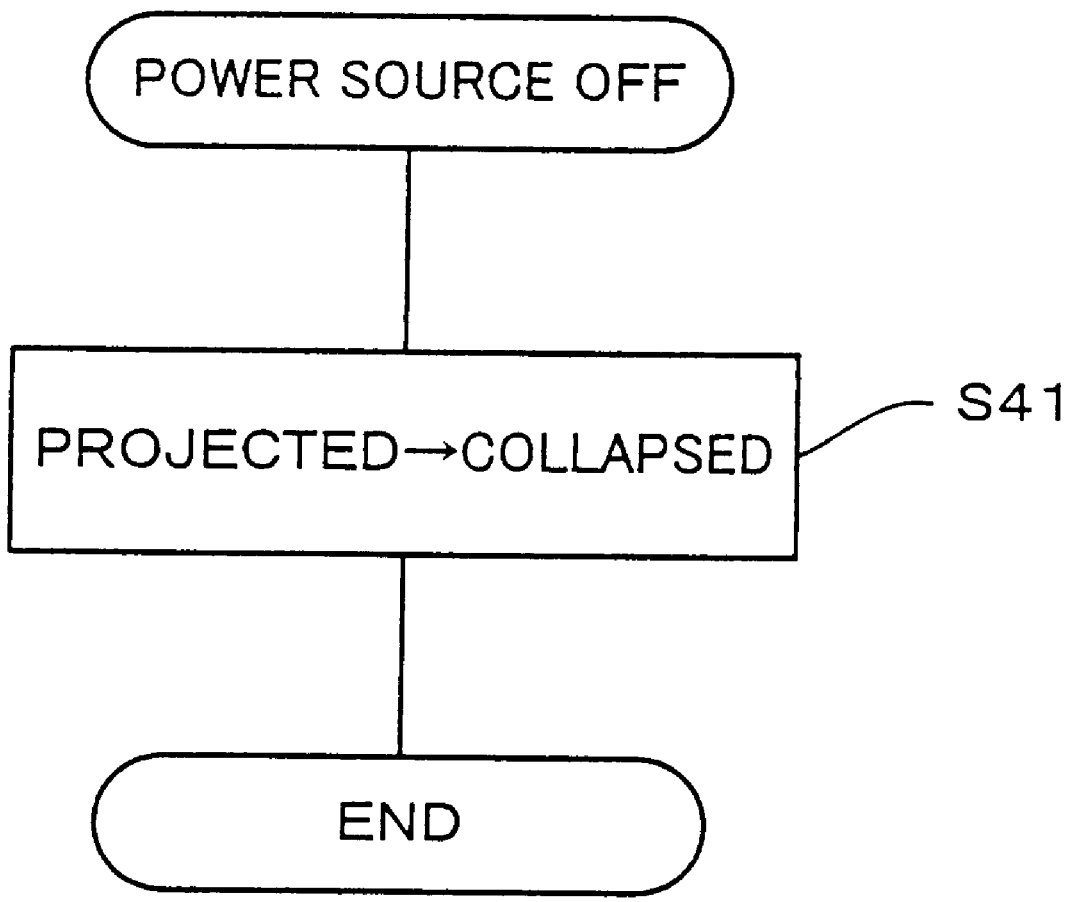
FIG. 13 is a flowchart detailing a power source OFF program that is run when a manipulation to turn OFF the power source of the camera is performed.

FIG. 13 is a flowchart detailing a power source OFF program that is run when a manipulation to turn OFF the power source of the camera is effected.

When the manipulation to turn OFF the power source of the camera 10 is effected, the electric motor 419 is driven first, and a driving force is delivered to the second driving gear 2, whereby the second driving gear 2 starts to rotate inversely in Step S41. Consequently, the zoom barrel 11 is moved to the initial projected state shown in FIG. 5. Then, the electric motor 418 is driven, and a driving force is delivered to the first driving gear 1, whereby the first driving gear 1 also starts to rotate inversely. Consequently, the zoom barrel 11 is moved to the collapsed state shown in FIG. 4, whereupon the routine is terminated. Subsequently, the power source of the camera 10 is turned OFF.

With the camera 10 of the present embodiment, as shown in FIG. 5, the entire zoom lens is projected to the maximum position from the camera main body 9 when the power source is initially supplied, and the focus adjustment is effected by returning the entire zoom lens toward the camera main body 9. It should be appreciated, however, that the present invention is not limited to the foregoing, and the entire zoom lens may be projected to a predetermined position from the camera main body 9 when the power source is initially supplied, so that the focus adjustment is effected by projecting the entire zoom lens further beyond the predetermined position.

Also, the present embodiment explained an example case that the camera 10 is arranged in such a manner that the focus cylinder 22 has the collapsed region as shown in FIG. 4, in which the zoom barrel 11 supporting the zoom lens is retracted until its top end portion is aligned with the front cover 3, and the focusing region as shown in FIG. 8, which is included in the collapsed region and in which the entire zoom lens is returned toward the camera main body 9. However, besides such a camera having the collapsed region, the first camera of the present invention can be modified to a camera, in which the focusing region alone is provided to the focus cylinder 22 and the zoom barrel 11 protrudes from the front cover 3.

Next, the following description will describe an embodiment of the second camera of the present invention.

FIGS. 1 and 2 were explained as the perspective views of the embodiment of the first camera of the present invention. However, the outside appearances shown in FIGS. 1 and 2 can be adapted to one embodiment of the second camera of the present invention, and hereinafter, FIGS. 1 and 2 are used as perspective views showing the outside appearance of one embodiment of the second camera of the present invention.

Figure 14:
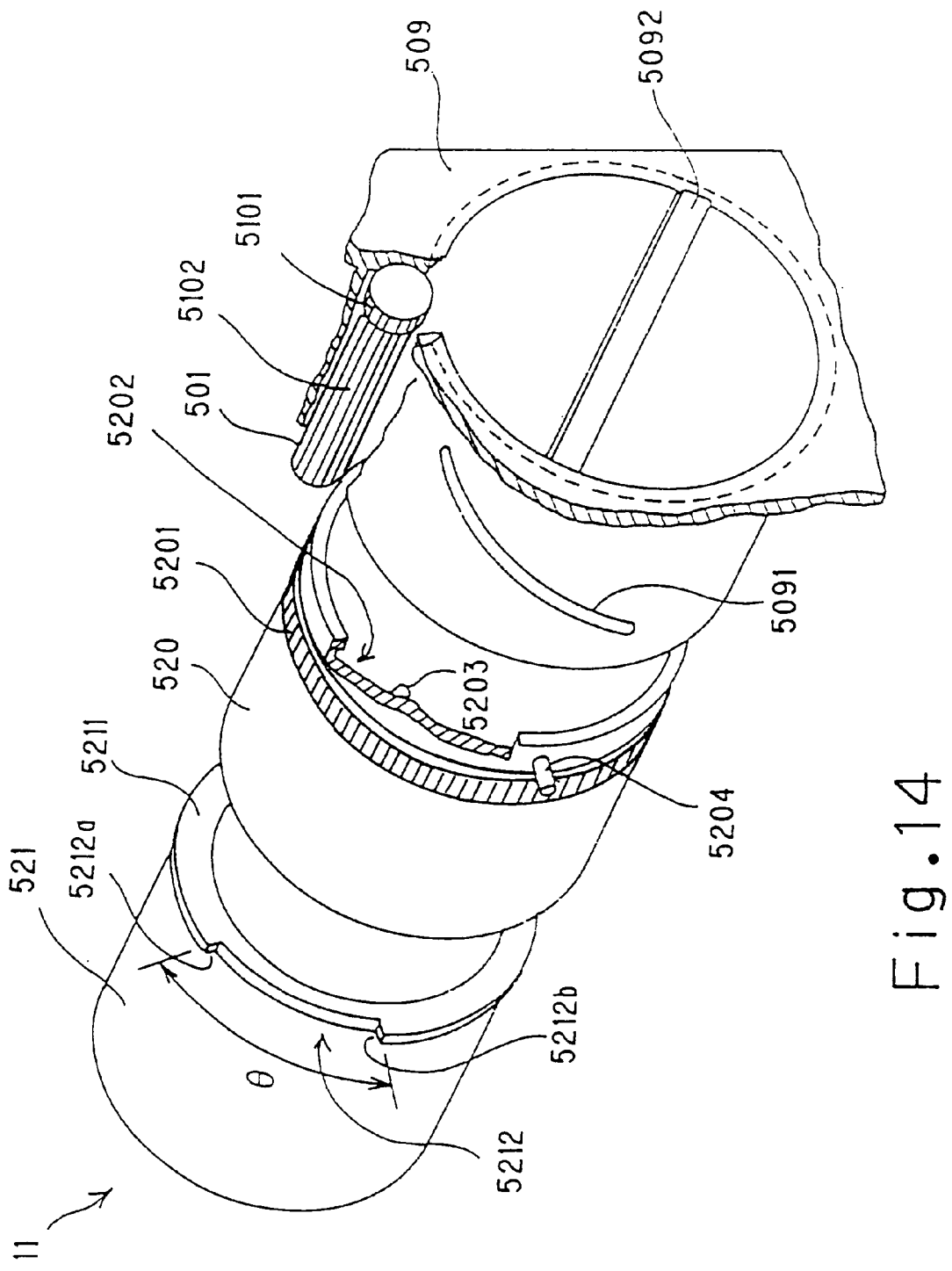
FIG. 14 is an exploded perspective view of the zoom barrel of the camera shown in FIGS. 1 and 2.

FIG. 14 is an exploded perspective view of a zoom barrel of the camera shown in FIGS. 1 and 2.

A zoom barrel 11 shown in FIG. 14 is provided with a driving gear 501 driven either in the forward or inversed direction. The driving gear 501 includes a flat gear portion 5101 formed at the end portion, and a flat gear portion 5102 formed along the circumference. The driving gear 501 is driven by an electric motor 618 (see FIG. 20). The electric motor 618 is driven either in the forward or inversed direction on the power supplied from a built-in battery 400. The electric motor 618 is linked to the flat gear portion 5101 of the driving gear 501 by an unillustrated gear train, and a driving mechanism from the electric motor 618 to the driving gear 501 corresponds to what is referred to as a driving source of the second camera of the present invention.

In addition, the zoom barrel 11 is incorporated with a zoom lens driving mechanism that effects (1) a zooming operation by driving the above driving source in the first direction (forward direction) while changing a distance from the focal point of a plurality of lens groups and intervals among the lens groups, and (2) a focusing operation following the zooming operation by driving the above driving source in the second direction (inverse direction) that is opposite to the first direction while maintaining the intervals among the plurality of lens groups. FIG. 14 shows a fixed cylinder 509, a first rotationally movable cylinder 520, and a second rotationally movable cylinder 521, which constitute the zooming driving mechanism.

The fixed cylinder 509 is fixed to the camera main body, and provided with a cam groove 5091 formed diagonally with respect to the optical axis direction, and a linearly moving key groove 5092 formed in parallel to the optical axis direction.

FIG. 14 shows a partially cut-out view of the first rotationally movable cylinder 520 to illustrate the interior arrangement thereof.

The first rotationally movable cylinder 520 includes an engaging gear 5201 engaged with the flat gear portion 5102 of the driving gear 501, a fitting rotary groove 5202 to which a rotary linking portion 5211 of the second rotationally movable cylinder 521 described below is fitted, an engaging pin 5203 formed in the fitting rotary groove 5202, and a cam pin 5204 formed upright on the outside wall of the first rotationally movable cylinder 520. The cam pin 5204 is inserted through the cam groove 5091 of the fixed cylinder 509. The first rotationally movable cylinder 520 is driven by the driving gear 501 to move in the optical axis direction by the cam groove 5091 while rotating around the optical axis.

The rotary linking portion 5211 of the second rotationally movable cylinder 521 fits into the fitting rotary groove 5202 of the first rotationally movable cylinder 520, so that the second rotationally movable cylinder 521 is allowed to rotate while maintaining the relative positions with respect to the first rotationally movable cylinder 520 in the optical axis direction. The rotary linking portion 5211 includes a linking portion 5212 formed by cutting out a part of the circumference. The linking portion 5212 includes two wall portions 5212a and 5212b. The engaging pin 5203 is inserted through the linking portion 5212. The second rotationally movable cylinder 521 is in the non-engaging state with respect to the first rotationally movable cylinder 520 in the rotating direction until the engaging pin 5203 touches either the wall portion 5212a or 5212b while it moves in the optical axis direction in association with a movement of the first rotationally movable cylinder 520 in the optical axis direction. The segment where second rotationally movable cylinder 521 is in the non-engaging state is referred to as the non-engaging region. In the collapsed state where the zoom barrel 11 is retracted in the camera main body, the engaging pin 5203 touches the wall portion 5212a of the linking portion 5212. When the first rotationally movable cylinder 520 starts to rotate and the engaging pin 5203 touches the wall portion 5212b, the second rotationally movable cylinder 521 also starts to rotate in association, and rotational driving of the second rotationally movable cylinder 521 effects zooming operation driving as will be described below.

Figure 15:
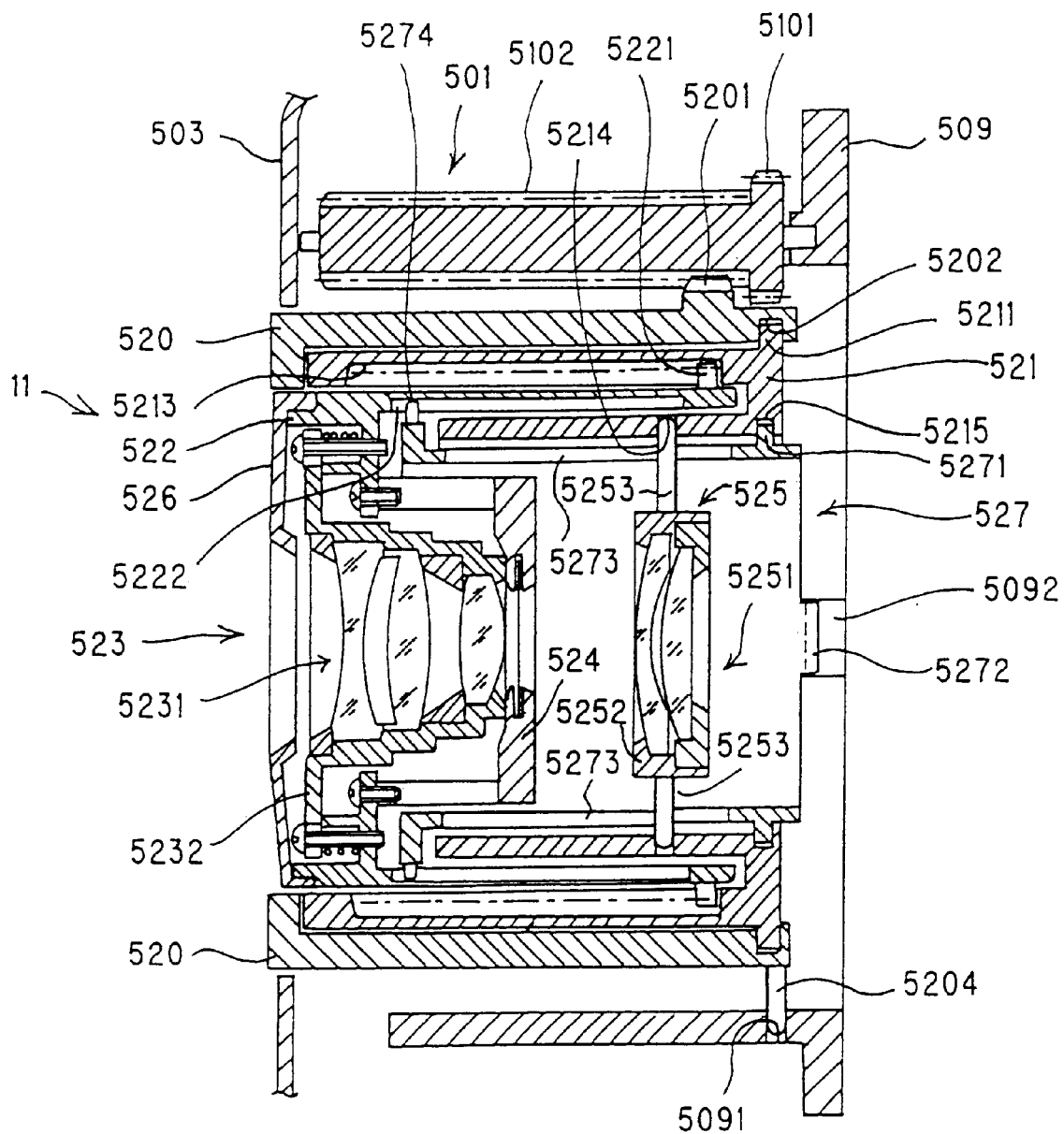
FIG. 15 is a cross section of the camera shown in FIG. 1, showing the collapsed state where the zoom barrel is retracted in the camera main body.

The following description will describe further an arrangement of the zoom lens driving mechanism provided to the zoom barrel 11 with reference to FIG. 15.

FIG. 15 is a cross section of the camera shown in FIG. 1, showing the collapsed state where the zoom barrel is retracted in the camera main body.

As shown in FIG. 15, the camera 10 of the present embodiment is a camera, in which the first rotationally movable cylinder 520 and a front group unit 523 are retracted to the collapsed state in the camera main body so as not to protrude therefrom when the camera is not in use.

The front group unit 523 is linked to a helicoids concave screw 5213 provided to the second rotationally movable cylinder 521 through a helicoids convex screw 5221, so that the front group unit 523 is moved linearly in the optical axis direction and projected relatively with respect to the second rotationally movable cylinder 521 in association with a rotation thereof. Because a rear group unit 525 is engaged with a cam groove 5214 provided in the second rotationally movable cylinder 521 through a rear group cam pin 5253, it is also moved linearly and projected in association with a rotation of the second rotationally movable cylinder 521.

The flat gear portion 5102 of the driving gear 501 is engaged with the engaging driving gear 5201 provided to the first rotationally movable cylinder 520, and when the driving gear 501 rotates, a rotational driving force is delivered to the driving gear 5201, whereby the first rotationally movable cylinder 520 starts to rotate around the optical axis. Hence, the first rotationally movable cylinder 520 is projected. As has been discussed, the rotary linking portion 5211 of the second rotationally movable cylinder 521 is fitted into the fitting rotary groove 5202 of the first rotationally movable cylinder 520, and the cam pin 5204 of the first rotationally movable cylinder 520 is fitted into the cam groove 5091 of the fixed cylinder 509. Thus, when the first rotationally movable cylinder 520 rotates, the cam pin 5204 moves forward in the optical axis direction as being guided by the cam groove 5091 in association with a rotation of the first rotationally movable cylinder 520. Also, the second rotationally movable cylinder 521 moves forward in the optical axis direction in association with a movement of the first rotationally movable cylinder 520 as one body. A rotation around the optical axis of the second rotationally movable cylinder 521 will be described later.

A rotary linking portion 5271 of a linearly moving key ring 527 is fitted into a fitting rotary portion 5215 of the second rotationally movable cylinder 521. Also, a linearly moving key 5272 provided to the linearly moving key ring 527 is fitted into the linearly moving key groove 5092 formed on the inside wall of the fixed cylinder 509. Thus, the linearly moving key ring 527 moves linearly in the optical axis direction together with the second rotationally movable cylinder 521, but it is not allowed to rotate around the optical axis direction. Also, the linearly moving key ring 527 is formed in the shape of a cylinder along the inner cylinder of the second rotationally movable cylinder 521, and a slit of a linearly moving key groove 5273 is formed in the corresponding portion in such a manner so as to extend linearly in the optical axis direction.

Also, the helicoids convex screw 5221 is formed on the outside wall of a linearly movable cylinder 522, while the helicoids concave screw 5213 is formed on the inside wall of the outer cylinder of the second rotationally movable cylinder 521, and the latter engages with the former. On the other hand, a linearly moving key groove 5222 formed on the inner surface of the linearly movable cylinder 522 is engaged with a linearly moving key 5274 of the linearly moving key ring 527. Thus, the linearly moving key 5274 does not allow the linearly movable cylinder 522 to rotate around the optical axis, and the linearly movable cylinder 522 moves in the optical direction in accordance with the helicoids concave screw 5213 in association with a rotation of the second rotationally movable cylinder 521.

Also, the rear group cam pin 5253 is formed upright on the outside wall of a rear group supporting frame 5252 of the rear group unit 525, and the rear group cam pin 5253 is inserted through the linearly moving key groove 5273 provided to the linearly moving key ring 527 and engages with the cam groove 5214 formed in the inner cylinder of the second rotationally movable cylinder 521. For this reason, the linearly moving key 5273 does not allow a rear group lens unit 5251 to rotate around the optical axis, and the rear group lens unit 5251 moves in the optical axis direction in accordance with a predetermined path pattern of the cam groove 5214 of the second rotationally movable cylinder 521 in association with a rotation thereof.

Further, a lens name plate 526 is attached to the front surface of the linearly movable cylinder 522. FIG. 15 shows a front cover 503 attached to the top and bottom of the first rotationally movable cylinder 520.

When the power source is supplied to the camera 10 formed in the above manner, the electronic motor 618 (see FIG. 20) starts to rotate in the forward direction, and a driving force is delivered to the flat gear portion 5101, whereby the driving gear 501 starts to rotate in the forward direction. Because the flat gear portion 5102 of the driving gear 501 is engaged with the driving gear 5201 of the first rotationally movable cylinder 520, the first rotationally movable cylinder 520 rotates around the optical axis in accordance with the flat gear portion 5102 of the driving gear 501 while moving forward at the same time. As has been explained, the rotary linking portion 5211 of the second rotationally movable cylinder 521 is fitted into the fitting rotary groove 5202 of the first rotationally movable cylinder 520, and the cam pin 5204 of the first rotationally movable cylinder 520 is inserted through the cam groove 5091 of the fixed cylinder 509. Also, the engaging pin 5203 (see FIG. 14) touches the wall portion 5212a of the second rotationally movable cylinder 521 when the first rotationally movable cylinder 520 starts to rotate, and the engaging pin 5203 moves toward the wall portion 5212b spaced apart from the opposing wall portion 5212a as the rotational driving of the first rotationally movable cylinder 520 starts. The engaging pin 5203 is in the non-engaging state where it is not engaged with the second rotationally movable cylinder 521 until it retouches the wall portion 5212b, and the second rotationally movable cylinder 521 is not allowed to be driven to rotate when the engaging pin 5203 is in the non-engaging region even if the first rotationally movable cylinder is driven to rotate. Hence, when the engaging pin 5203 is in the non-engaging region, a rotational driving force of the first rotational driving cylinder 520 does not drive the second rotationally movable cylinder 521 and any mechanical component linked to the same. Thus, the first rotationally movable cylinder 520 and all of the barrel mechanical components linked to the same are guided by the cam groove 5091 and projected without changing the relative relation of the front group unit 523 and rear group unit 525. Then, when the engaging pin 5203 retouches the wall portion 5212b, the first rotationally movable cylinder 520 is driven to rotate in association with the second rotationally movable cylinder 521. This rotational driving drives all the barrel mechanism components linked to the second rotationally movable cylinder 521, whereby the first rotationally movable cylinder 520 and all of the barrel mechanism components linked to the same are projected while changing the relative relation of the front group unit 523 and rear group unit 525. In this manner, a cam pin 5204 formed upright on the first rotationally movable cylinder 520 reaches the predetermined position in the stroke of the cam groove 5091, whereupon it is detected whether the first rotationally movable cylinder 520 and all of the barrel mechanism components linked to the same are projected for a predetermined amount by detecting the position of the barrel with a known method (not shown). Then, the driving power source is turned OFF to stop the initial projecting action and a stand-by sate for the following operation is maintained. At this point, the non-engaging region is matched with the predetermined position in the stroke of the cam groove 5204. In other words, an arrangement of the mechanism such that matches the width of the non-engaging region with the initial projecting amount, and an arrangement of the mechanism such that limits the non-engaging region within the predetermined position in the stroke of the cam groove 5091, namely, an arrangement of the mechanism such that the width of the non-engaging region is included in the initial projection amount become available. These arrangements are selected in consideration with the other related mechanism portions. In the present embodiment, the arrangement of the mechanism such that matches the width of the non-engaging region with the initial projection amount is selected.

Figure 16:
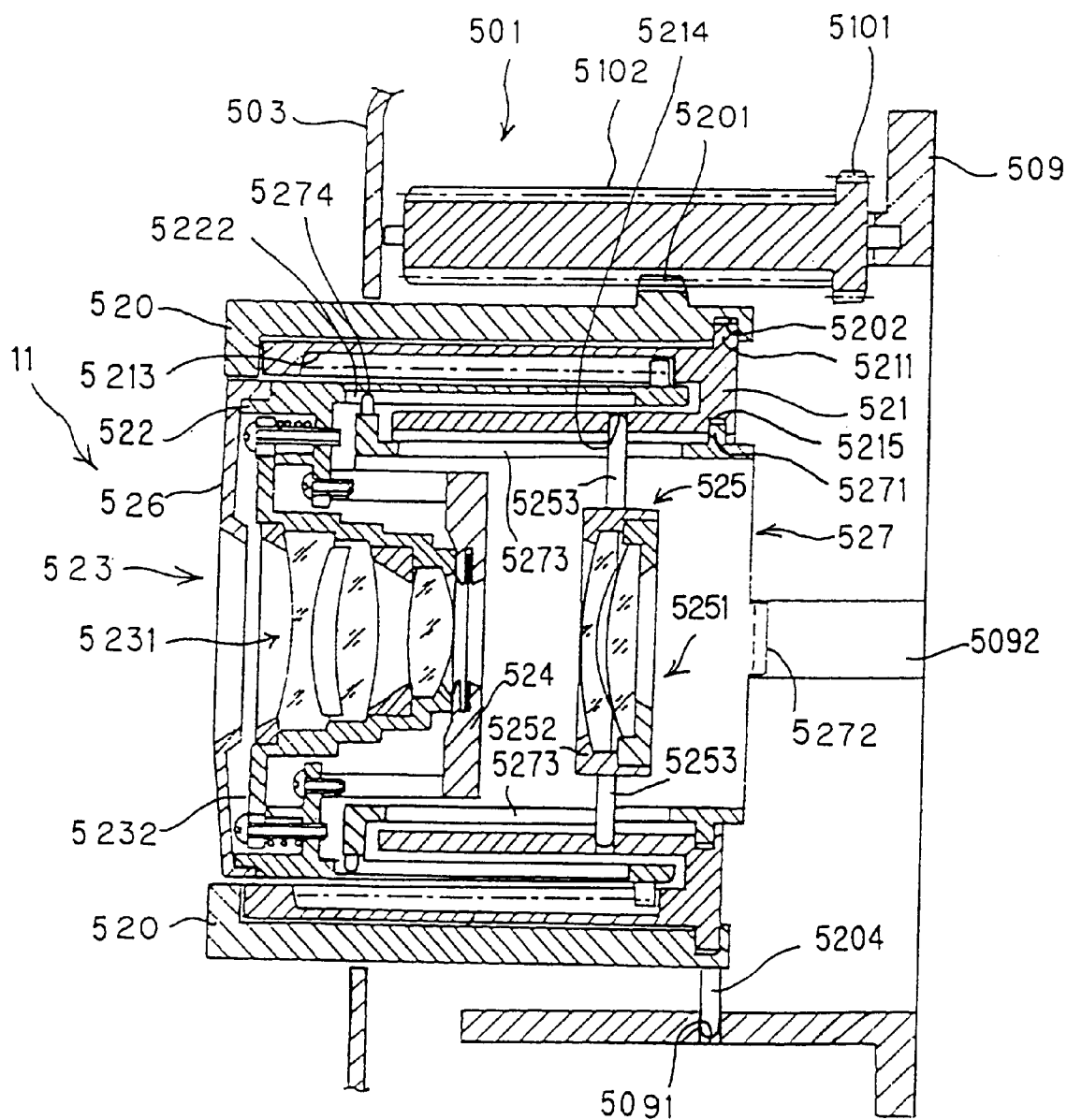
FIG. 16 is a cross section of the camera shown in FIG. 2, showing the projected state where the zoom barrel is projected from the camera main body.

FIG. 16 is a cross section of the camera shown in FIG. 1, showing the initial projected state where the zoom barrel is projected from the camera main body.

When the zoom barrel 11 is initially projected upon supply of the power source, as shown in FIG. 16, the relative positions of a front group lens unit 5231 and a rear group lens unit 5251 are the same as those of the front group lens unit 5231 and rear group lens unit 5251 in the foregoing collapsed state shown in FIG. 15. Here, the zooming manipulation lever is manipulated toward the telephoto terminus, whereupon the zooming operation toward the telephoto terminus is effected.

Figure 17:
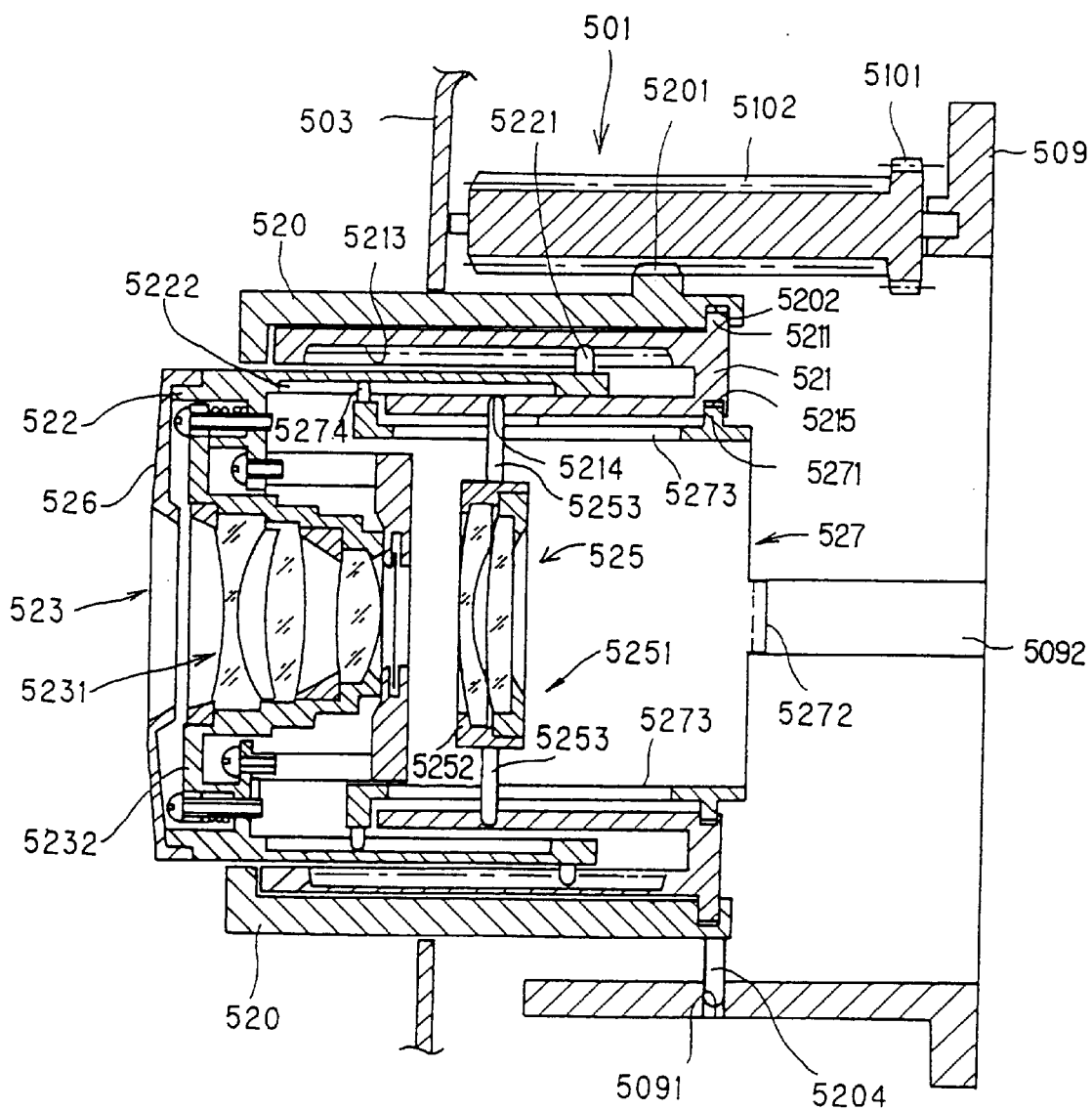
FIG. 17 is a cross section of the camera shown in FIG. 2, showing a state where a zooming operation toward the telephoto terminus is effected.

FIG. 17 is a cross section of the camera shown in FIG. 2, showing the state where the zooming operation toward the telephoto terminus is effected.

In this zooming operation, the driving gear 501 rotates further in the forward direction, and the first rotationally movable cylinder 520 is projected while rotating around the optical axis by the cam groove 5091 through the driving gear 5201 engaged with the flat gear portion 5102. Because the engaging pin 5203 touches the wall portion 5212*b*, the second rotationally movable cylinder 521 also rotates around the optical axis through the engaging pin 5203 while moving forward with the first rotationally movable cylinder 520 as one body. Accordingly, the linearly movable cylinder 522 starts to move linearly along the optical axis direction (toward the left in FIG. 17) by the foregoing action through the helicoids concave screw 5213 provided to the second rotationally movable cylinder 521 and the helicoids convex screw 5221 provided to the linearly movable cylinder 522. In addition, the cam pin 5253 is engaged with the cam groove 5214 provided on the inner wall surface of the second rotationally movable cylinder 521 and having another guiding portion. Thus, the rear group unit 525 moves linearly in the optical axis direction along the latter guiding portion. In this manner, the zooming operation by the zoom barrel 11 toward the telephoto terminus is effected. In the present embodiment, the zooming operation toward the telephoto terminus is effected, and the zooming operation is terminated when a desired focal length is obtained, after which the current state where the engaging pin 5203 touches the wall portion 5212*b* is maintained as the stand-by state for the following different operation.

On the other hand, when the zooming manipulation lever is manipulated toward the wide angle terminus, the zooming operation toward the wide angle terminus is effected. In the zooming operation toward the wide angle terminus, the driving gear 501 rotates inversely, and a rotational driving force is delivered to the first rotationally movable cylinder 520 through the driving gear 5201, whereby the first rotationally movable cylinder 520 starts to rotate inversely around the optical axis. Consequently, the first rotationally movable cylinder 520 alone moves in the inverse direction until the engaging pin 5203 having touched the wall portion 5212*b* as shown in FIG. 14 retouches the opposing wall portion 5212*a*. When the engaging pin 5203 retouches the wall portion 5212*a*, the first rotationally movable cylinder 520 rotates further in the inverse direction in association with the second rotationally moving cylinder 521, and the zooming operation by the zoom barrel 11 toward the wide angle terminus from the telephoto terminus is effected by following the foregoing actions inversely. The zooming manipulation is terminated when a desired focal length is obtained by the zooming operation toward the wide angle terminus, and the first rotationally movable cylinder 520 rotates in the forward direction and then stops, so that the current state is shifted to the stand-by state for the following different operation.

Figure 18:
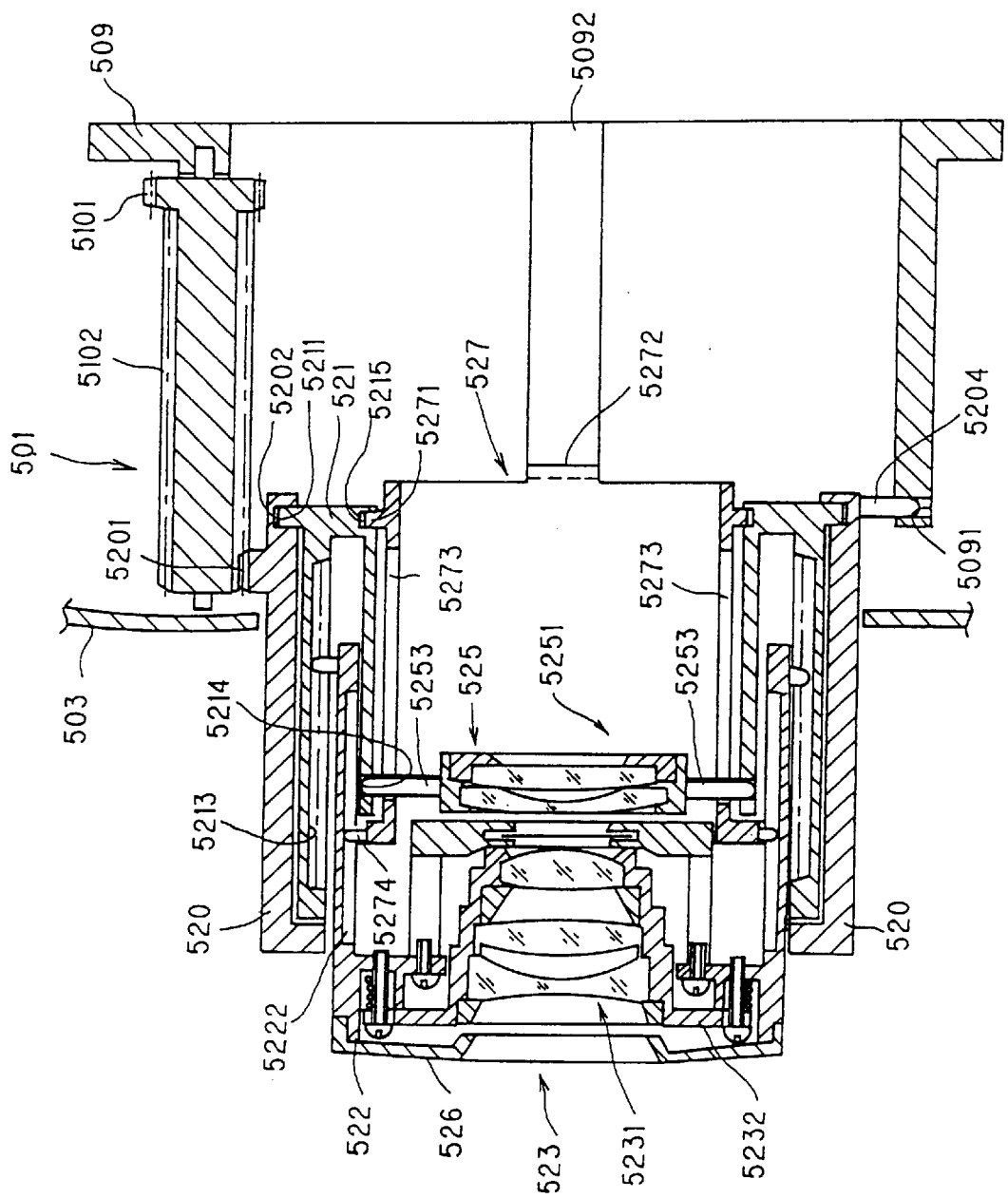
FIG. 18 is a cross section showing a state where a further zooming operation toward the telephoto terminus is effected in the state where the zooming operation toward the telephoto terminus shown in FIG. 17 has been effected.

FIG. 18 is a cross section showing a state where a further zooming operation toward the telephoto terminus is effected from the state shown in FIG. 17 where the zooming operation is effected toward the telephoto terminus.

When the driving gear 501 rotates further in the forward direction in the state shown in FIG. 17 where the zooming operation toward the telephoto terminus is effected, the first rotationally movable cylinder 520 and second rotationally movable cylinder 521 are projected in the optical axis direction (toward the left in FIG. 18) in the path through which driving is delivered in the manner described above while rotating around the optical axis. Thus, the front group unit 523 and rear group unit 525 are projected linearly along the optical axis direction while changing the relative interval in the path through which driving is delivered in the manner described above. In this manner, the zoom barrel 11 is projected further by effecting a further zooming operation toward the telephoto terminus.

Figure 19:
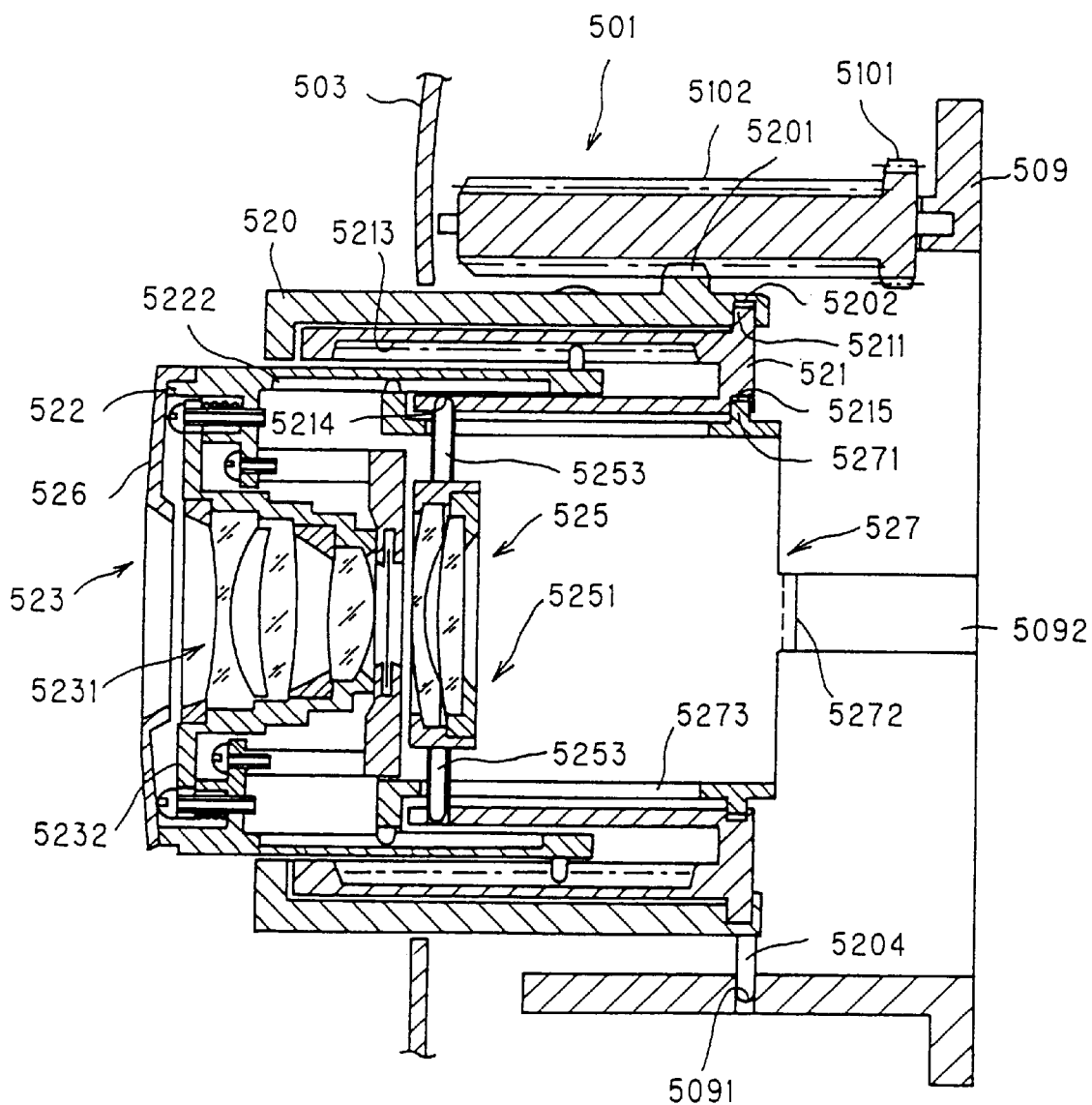
FIG. 19 is a cross section showing a state where a focus adjustment is effected when a shutter release button is pressed after the zooming operation shown in FIG. 18 is effected and a zooming manipulation is terminated.

FIG. 19 is a cross section showing a state where the focus adjustment is effected when the shutter release button is pressed after the zooming operation shown in FIG. 18 is effected and the zooming manipulation is terminated.

When the shutter release button 12 is pressed in the state where the zooming operation shown in FIG. 18 is effected, a distance to the subject is measured by an active-type auto-focus device installed in the camera 10, and the focus adjustment is effected by adjusting a travel amount of the entire zoom lens in accordance with a control signal from an AF signal representing the measured distance before the shutter is released to open and close. More specifically, the driving gear 501 rotates in the inverse direction, and a rotational driving force is delivered to the first rotationally movable cylinder 520 through the driving gear 5201. Accordingly, the first rotationally movable cylinder 520 starts to rotate inversely around the optical axis. However, because the engaging pin 5203 of the first rotationally movable cylinder 520 touches the wall portion 212*b* (see FIG. 14) of the linking portion 212 provided to the second rotationally movable cylinder 521 at the beginning of a rotation, the first rotationally movable cylinder 520 moves away from the wall portion 5212*b* in the direction to approximate to the opposing wall portion 5212*a* in association with the rotation. In the non-engaging region until the engaging pin 5203 retouches the wall portion 5212*a*, the first rotationally movable cylinder 520 alone rotates around the optical axis, and the cam pin 5204 of the first rotationally movable cylinder 520 retracts as being guided by the cam groove 5091 of the fixed cylinder 509, but because a rotational driving force is not delivered to the second rotationally movable cylinder 521, the second rotationally movable cylinder 521 retracts with the first rotationally movable cylinder 520 as one body. Because the second rotationally movable cylinder 521 is engaged with the linearly movable cylinder 522 as an integral part of the front group unit 523 and the rear group unit 525, the front group unit 523 and rear group unit 525 change their positions with respect to the camera's focus plane while maintaining a relative interval therebetween as the second rotationally movable cylinder 525 retracts without rotation. If the guiding portion of the cam groove 5091 in the non-engaging region is designed at specification corresponding to the focus adjustment, a travel amount corresponding to a desired focal point is obtained based on the AF signal, thereby making it possible to effect the focal adjustment (focus adjustment). In this manner, the focus adjustment is effected by moving the front group lens unit 5231 and rear group lens unit 5251 as one body in the optical axis direction, in other words, by an action to return the entire zoom lens toward the camera main body. Thus, the relative positions of the front group lens unit 5231 and rear group lens unit 5251 are the same as those of the first lens unit 5231 and rear group lens unit 5251 in the foregoing zooming operation effected state shown in FIG. 18. In the conventional technique to effect the focus adjustment by adjusting the position of the rear lens group with respect to the front lens group, a slight displacement caused by an error in the relative positions of these lens groups occurring from inaccuracy of the components and assembly reduces the resolution of the lens, thereby making it difficult to obtain a satisfactory image. However, in the present invention, because the focus adjustment is effected while maintaining the relative positional relation of the lens groups, the focus adjustment can be effected while maintaining the lens resolution accurately, thereby making it possible to obtain a picture of stable resolution. Thus, neither high accurate components nor assembly is necessary and the cost can be saved. In addition, in the second camera of the present invention, both the zooming operation and focusing operation by the zoom barrel 11 are effected by a single driving mechanism from the electric motor 618 to the driving gear 501, and therefore, the arrangement can be simplified.

Figure 20:
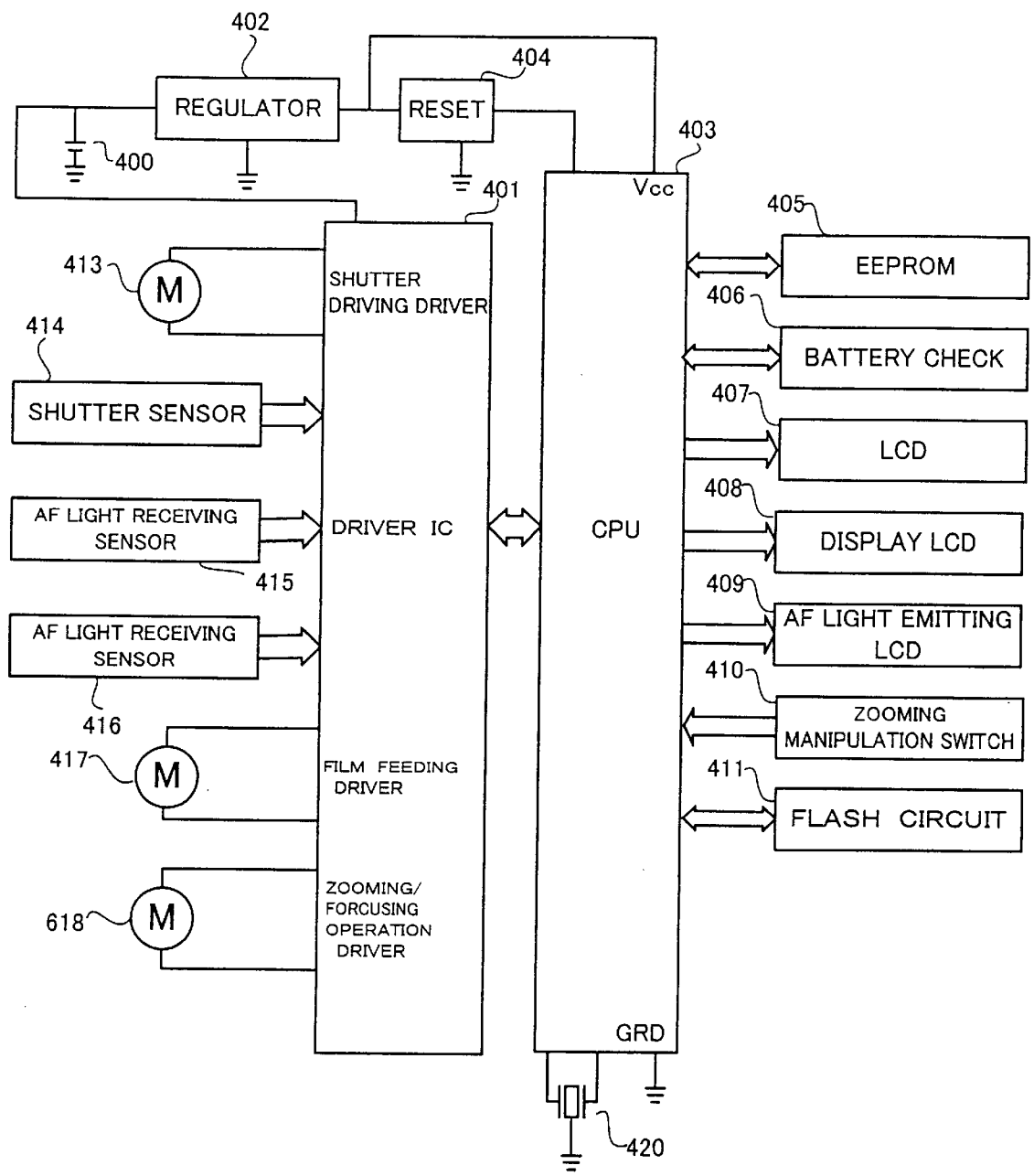
FIG. 20 is a circuit block diagram of one embodiment of the camera of the present invention.

FIG. 20 is a circuit block diagram of the camera of the present embodiment.

FIG. 20 corresponds to FIG. 9, which is a circuit block diagram of the foregoing one embodiment of the first camera of the present invention, and only the difference from FIG. 9 will be explained.

The circuit shown in FIG. 9 is provided with the electric motor 418 for the focusing operation and the electric motor 419 for the zooming operation separately, and the driver IC 401 correspondingly encloses the driver for the focusing operation and the driver for the zooming operation. However, the circuit shown in FIG. 20 is provided with the electric motor 618 used commonly in the zooming operation and the focusing operation instead of the two electric motors 418 and 419 of FIG. 9, and the driver IC 401 correspondingly includes a zooming/focusing operation driver used commonly for the zooming operation and the focusing operation instead of the driver for the focusing operation and the driver for the zooming operation in the driver IC of FIG. 9.

The driver for the zooming/focusing operation enclosed in the driver IC 401 operates as follows in the zooming operation. That is, at a command from the CPU 403 upon detection of the ON/OFF action of the zooming manipulation switch 410 in accordance with the manipulation of the zooming manipulation lever, the driver drives the electric motor 618 in the forward direction to move the zoom barrel 11 toward the telephoto terminus or drives the electric motor 618 in the inverse direction to move the zoom barrel 11 toward the wide angle terminus. On the other hand, the driver operates as follows in the focusing operation. That is, the driver drives the electric motor 618 in the inverse direction in accordance with the distance measuring result from the AF light receiving sensor 416 to effect the focusing operation for the focus adjustment.

The CPU 403 in FIG. 20 runs programs similar to those run by the CPU 403 in FIG. 9 as was explained with reference to FIGS. 10 through 13. The programs run by the CPU 403 in FIG. 20 are slightly different from those run by the CPU 403 in FIG. 9, but they can be detailed by the same program flowcharts shown in FIGS. 10 through 13. Thus, new flowcharts are not given herein and the programs run by the CPU 403 in FIG. 20 will be detailed with reference to the flowcharts in FIGS. 10 to 13.

FIG. 10 is a flowchart detailing a power source ON program that is run when the power source of the camera is turned ON.

This program is run in the CPU 403 shown in FIG. 20. When the power source of the camera 10 is turned ON, the electric motor 618 shown in FIG. 20 is driven in the forward direction in Step S11, and a driving force of the electric motor 618 is delivered to the driving gear 501, whereby the driving gear 501 starts to rotate in the forward direction. Thus, the collapsed state shown in FIG. 15 shifts to the initial projected state shown in FIG. 16, whereupon the routine is terminated.

FIG. 11 is a flowchart detailing the zooming manipulation program.

When a zooming operation command is issued by manipulation of the zooming manipulation switch 410 (see FIG. 20), the electric motor 618 is driven further in the forward direction in Step S21, and a driving force of the electric motor 618 is delivered to the driving gear 501, whereby the zooming operation is effected and the routine is terminated. Consequently, the projected state shown in FIG. 16 shifts to the zooming state shown in FIG. 17 or 18.

FIG. 12 is a flowchart detailing a shutter release button ON program that is run when the shutter release button of the camera is pressed.

When the shutter release button of the camera 10 is pressed, the focusing operation in Step S31 is effected as a light measuring operation for measuring brightness of a subject to be taken is effected, while a distance to the subject is measured by the auto-focus device. In this focusing operation, the electric motor 618 is driven in the inverse direction based on the control signal from the AF signal representing the measured distance. Accordingly, the position of the entire zoom lens is returned toward the camera main body by rotating the driving gear 501 inversely, so that the focus adjustment is effected by changing the position of the entire zoom lens with respect to the focus plane.

Next, in Step S32, whether the flash light should flashed or not is determined based on a light quantity obtained by the light measuring operation. When it is judged that the light flashing is not necessary, the shutter is operated and closed and the flow proceeds to S33. On the other hand, when it is judged that the light flashing is necessary, a series of actions including shutter opening, strobe flashing, and shutter closing are performed, and the flow proceeds to Step S33. In Step S33, the electric motor 618 is driven in the forward direction so as to rotate the driving gear 501 in the forward direction, so that the entire zoom lens is returned to the position where it was before the shooting to prepare for the following shooting. In addition, the electric motor 417 is driven to wind up the picture film for one frame, whereupon the routine is terminated.

FIG. 13 is a flowchart detailing a power source OFF program that is run when a manipulation to turn OFF the power source of the camera is performed.

When a manipulation to turn OFF the power source of the camera 10 is performed, the electric motor 618 is driven in he inverse direction in Step S41, and a driving force is delivered to the driving gear 501, whereby the driving gear 501 starts to rotate inversely. Accordingly, the zoom barrel 11 is moved to be in the collapsed state shown in FIG. 15, whereupon the routine is terminated. Subsequently, the power source of the camera 10 is turned OFF.

With the embodiment of the second camera of the present invention explained with reference to FIG. 14 and subsequent drawings, the mechanism is formed in such a manner that the stand-by position is set when the engaging pin 5203 formed upright on the first rotationally movable cylinder 520 touches the wall portion 5212b provided to the second rotationally movable cylinder 521. It should be appreciated, however, that the mechanism can be arranged by setting the stand-by position in the state where the engaging pin 5203 touches the wall portion 5212a opposing the wall portion 5212b. In this case, different from the embodiment explained with reference to FIG. 14 and subsequent drawings, the focus adjustment is effected by setting the driving direction of the driving source in the rotationally driving direction same as the projection direction of the zoom lens barrel. More specifically, because the non-engaging region of the engaging pin 5203 in the stand-by state can be set in any desired manner, the related mechanism and operation sequence can be designed optimally to the set position.

Further, it should be appreciated that the mechanism for forming the non-engaging region can be other than the one composed of the foregoing engaging pin and cut-out portion.

Also, in the above embodiment, the entire zoom lens barrel is retracted to the collapsed position so as not to protrude from the camera main body when the camera is not in use, but the entire zoom lens is not necessarily retracted to the collapsed position so as not to protrude from the camera main body when the camera is not in use. For example, only a part of the zoom lens barrel may be retracted, or if there is a sufficient margin in the optical axis direction of the camera, the mechanism and operation sequence can be designed so that the first rotationally movable cylinder functions for the focus adjustment alone without securing the collapsed region. It should be noted that the second camera of the present invention is characterized in that the focus adjustment is effected while maintaining the relative positional relation in the optical axis direction of a plurality of lens groups forming the zoom lens when the focal point is adjusted in the non-engaging region.

As has been discussed, according to the present invention, a camera capable obtaining stable resolution and saving the cost can be provided.

What is claimed is:

1. A camera provided with a zoom lens having a plurality of lens groups for forming an image of a subject on a predetermined image forming plane by said zoom lens, comprising:
    a first driving source;
    a second driving source; and
    a lens driving mechanism for effecting (1) a focusing operation by driving said first driving source while maintaining distances among said plurality of lens groups, and (2) a zooming operation by driving said second driving source while changing the distances among said plurality of lens groups.

2. A camera provided with a zoom lens having a plurality of lens groups for forming an image of a subject on a predetermined image forming plane by said zoom lens, comprising:
    a first driving source;
    a rotatable ring, which is allowed to rotate around an optical axis when driven by said first driving source;
    a focus cylinder connected to said rotatable ring so as to move linearly in an optical axis direction in association with a rotation of said rotatable ring;
    a second driving source;
    a rotationally movable cylinder engaged with said focus cylinder in the optical axis direction so as to move in association with a movement of said focus cylinder in the optical axis direction, and provided rotatably around the optical axis with respect to said focus cylinder in a rotating direction so as to rotate when driven by said second driving source; and
    a plurality of lens holding frames, each holding their respective lens groups and linked to said rotationally movable cylinder so as to move in the optical axis direction relatively with respect to said rotationally movable cylinder in association with a rotation thereof.

3. The camera according to claim 1, wherein said first driving source effects the focusing operation by means of rotational driving, and the focusing operation is effected by driving said first driving source to rotate in a forward direction.

4. The camera according to claim 1, wherein said first driving source effects the focusing operation by means of rotational driving, and the focusing operation is effected by driving said first driving source to rotate in an inverse direction.

5. The camera according to claim 2, wherein said focus cylinder retracts said rotationally movable cylinder in a camera main body to a collapsed position where no photograph can be taken.

6. A camera comprising:
    a zoom lens enclosed therein; and
    a linking portion for linking a first barrel assembly for varying a focal length by changing a relative positional relation in an optical axis direction among a plurality of lens groups forming said zoom lens to a second barrel assembly for changing a position of said first barrel assembly in the optical axis direction with respect to a shooting focus plane,
    wherein said second barrel assembly is driven first by using a driving force of a driving source, and thence the driving force from said second barrel assembly is delivered to said first barrel assembly through said linking portion.

7. The camera according to claim 6, wherein a position of said linking portion in the optical axis direction is changed with respect to the shooting focus plane, and said linking portion serves as a mechanism for moving said first and second barrel assemblies without changing an interval therebetween.

8. A camera comprising:
    a zoom lens enclosed therein; and
    a linking portion for linking a first barrel assembly for varying a focal length by changing a relative positional relation in an optical axis direction among a plurality of lens groups forming said zoom lens to a second barrel assembly for changing a position of said first barrel assembly in the optical axis direction with respect to a shooting focus plane, wherein:

said second barrel assembly is driven first by using a driving force of a single driving source, and thence the driving force is delivered to said first barrel assembly by driving said second barrel assembly;

a driving force non-delivering region where the driving force is not delivered is formed within said linking portion of said first barrel assembly and second barrel assembly; and a focus adjustment is effected while said second barrel assembly alone is driven within said driving force non-delivering region.

9. A camera comprising:

a zoom lens enclosed therein; and a linking portion for linking a first barrel assembly for varying a focal adjustment by changing a relative positional relation in an optical axis direction among a plurality of lens groups forming said zoom lens to a second barrel assembly for changing a position of said first barrel assembly in the optical axis direction with respect to a shooting focus plane, wherein:

said second barrel assembly is driven first by using a driving force of a single driving source, and thence the driving force is delivered to said first barrel assembly by driving said second barrel assembly;

said camera is provided with a collapsed region, in which both of said first barrel assembly and second barrel assembly are retracted in a camera main body when said camera is not in use, and projected to an outside of the camera main body when said camera is in use;

a driving force non-delivering region where the driving force is not delivered is provided within said linking portion;

a focus adjustment is effected while said second barrel assembly alone is driven in said driving force non-delivering region; and said driving force non-delivering region is included in said collapsed region.

10. The camera according to claim 9, wherein a driving force of said single driving source in one direction is used to drive said second barrel assembly in a projection direction in said collapsed region, and a driving force of said driving source in another direction is used to effect the focus adjustment in the collapsed region.

11. A camera provided with a zoom lens having a plurality of lens groups for forming an image of a subject on a predetermined image forming plane by said zoom lens, comprising:

a driving source, which is allowed to be driven in one of a forward direction and an inverse direction; and a lens driving mechanism for effecting a zooming operation by driving said driving source in a first direction while changing distances among said plurality of lens groups, and subsequent to said zooming operation, effecting a focusing operation by driving said driving source in a second direction which is opposite to said first direction while maintaining the distances among said plurality of lens groups.

12. A camera provided with a zoom lens having a plurality of lens groups for forming an image of a subject on a predetermined image forming plane by said zoom lens, comprising:

a driving source, which is allowed to be driven in one of a forward direction and an inverse direction;

a first rotational movable cylinder, which moves in an optical axis direction while rotating around an optical axis when driven by said driving source;

a second rotational movable cylinder engaged with said first rotationally movable cylinder in the optical axis direction so as to move in association with a movement of said first rotationally movable cylinder in the optical axis direction, said second rotational movable cylinder also engaging with said first rotationally movable cylinder in a rotating direction while securing a clearance so as to rotate around the optical axis in association with a rotation of said first rotationally movable cylinder, when said first rotationally movable cylinder inverts a rotating direction, said second rotationally movable cylinder stopping a rotation thereof regardless of a rotation of said first rotationally movable cylinder until said first rotationally movable cylinder rotates for a predetermined angle of rotation, when said first rotationally movable cylinder has rotated for the predetermined angle of rotation, said second rotationally movable cylinder engaging with said first rotationally movable cylinder so as to rotate again in association with a rotation of said first rotationally movable cylinder; and a plurality of lens holding frames, each holding their respective lens groups and connected to said second rotationally movable cylinder so as to move in the optical axis direction relatively with respect to said second rotationally movable cylinder in association with a rotation thereof.

13. The camera according to claim 12, wherein a lens barrel including said first rotationally movable cylinder, second rotationally movable cylinder, and said plurality of lens holding frames is allowed to be retracted in a camera main body to a collapsed position where no photograph can be taken.

* * * * *